United States Patent [19]

Cason et al.

[11] Patent Number: 6,035,300
[45] Date of Patent: Mar. 7, 2000

[54] METHOD AND APPARATUS FOR GENERATING A USER INTERFACE FROM THE ENTITY/ATTRIBUTE/RELATIONSHIP MODEL OF A DATABASE

[75] Inventors: Stanley Phillip Cason, Johnson City, N.Y.; Mark Anthony Musa, Williston, Vt.

[73] Assignee: International Business Machines Corporation, Armonk, N.Y.

[21] Appl. No.: 08/572,988

[22] Filed: Dec. 15, 1995

[51] Int. Cl.[7] .................................................. G06F 17/00
[52] U.S. Cl. ........................ 707/102; 707/104; 345/333
[58] Field of Search ................... 707/1, 2, 103, 707/104, 102, 100; 345/333–335

[56] References Cited

U.S. PATENT DOCUMENTS

| | | | |
|---|---|---|---|
| 4,805,099 | 2/1989 | Huber ...................................... | 364/300 |
| 4,887,207 | 12/1989 | Natarajan ................................ | 364/401 |
| 5,193,183 | 3/1993 | Bachman ................................ | 395/600 |
| 5,233,513 | 8/1993 | Doyle ..................................... | 354/401 |
| 5,235,673 | 8/1993 | Austvold et al. ........................ | 395/76 |
| 5,249,300 | 9/1993 | Bachman et al. ....................... | 395/800 |
| 5,261,044 | 11/1993 | Dev et al. ............................... | 395/159 |
| 5,291,587 | 3/1994 | Kodosky et al. ....................... | 395/500 |
| 5,303,146 | 4/1994 | Ammirato et al. ..................... | 364/401 |
| 5,315,709 | 5/1994 | Alston, Jr. et al. ..................... | 395/600 |
| 5,335,323 | 8/1994 | Kolnick .................................. | 395/164 |
| 5,448,686 | 9/1995 | Borrel et al. ........................... | 395/120 |
| 5,550,971 | 8/1996 | Brunner et al. ........................ | 395/161 |
| 5,555,365 | 9/1996 | Selby et al. ............................. | 395/159 |
| 5,594,899 | 1/1997 | Knudsen et al. ....................... | 395/600 |
| 5,627,979 | 5/1997 | Chang et al. ........................... | 395/335 |
| 5,659,723 | 8/1997 | Dimitrios et al. ...................... | 395/614 |
| 5,713,014 | 1/1998 | Durflinger et al. ..................... | 395/604 |
| 5,717,925 | 2/1998 | Harper et al. .......................... | 395/613 |
| 5,809,266 | 9/1998 | Touma et al. .......................... | 395/340 |
| 5,832,498 | 11/1998 | Exertier .................................. | 707/103 |

FOREIGN PATENT DOCUMENTS

| | | |
|---|---|---|
| 04127370 | 4/1992 | Japan . |
| WO9324896 | 12/1993 | WIPO . |

OTHER PUBLICATIONS

IBM Technical Disclosure Bulletin, vol. 27, No. 4A, Sep. 1984, "Automated Engineering Schedule Algorithm", pp. 2028–2030.

IBM Technical Disclosure Bulletin, vol. 33, No. 9, Feb. 1991, "Interactive Schema Diagram to Visually Represent Tables of Related Data and Meaningful Joins Between Tables" pp. 243–246.

Research Disclosure: 31720, Sep. 1990, No. 317, Method to Maintain Discarded Information in a Graphical Interface.

Logic Works Erwin Methods Guide, Copyright Logic Works, 1989–95, pp. 13–29, 53 & 55.

Mighty Morphin' Programming Packages Flatten the Backlog Curve, Sep. 12, 1995, J. Brooks, S. Cason.

Business Area Analysis Using ADW, Copyright by Data Base Management, Inc. DBMI, Data Management Inc.

*Primary Examiner*—Paul V. Kulik
*Attorney, Agent, or Firm*—Ratner & Prestia; Arthur J. Samodovitz

[57] ABSTRACT

A computer system modeling tool generates a working user interface from the entities, attributes and relationships of a data model while assuring referential data integrity and and enforcing cardinality.

8 Claims, 27 Drawing Sheets

EAR MODEL

PHYSICAL MODEL

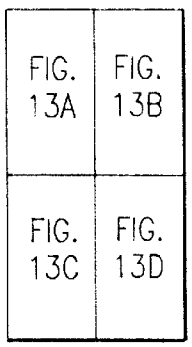
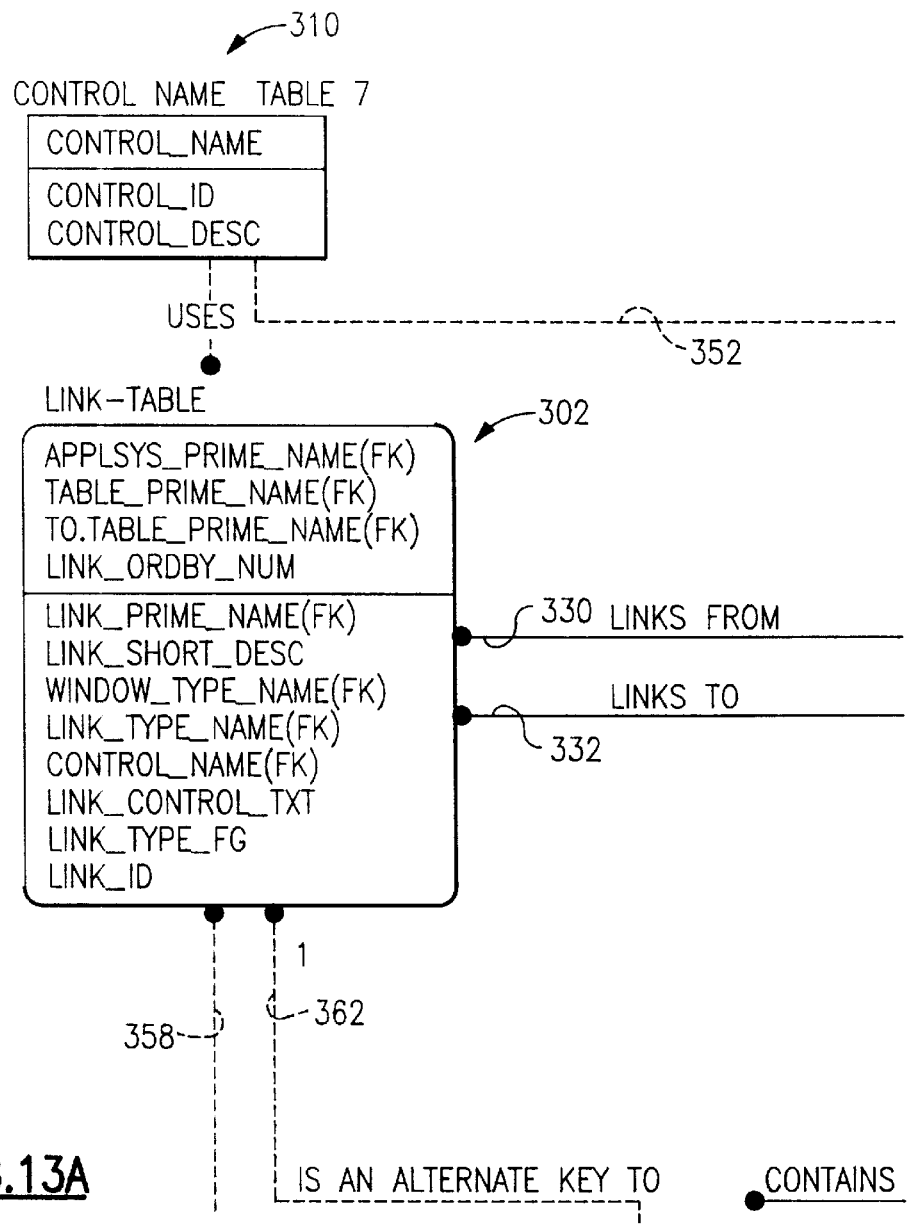

EAR MODEL

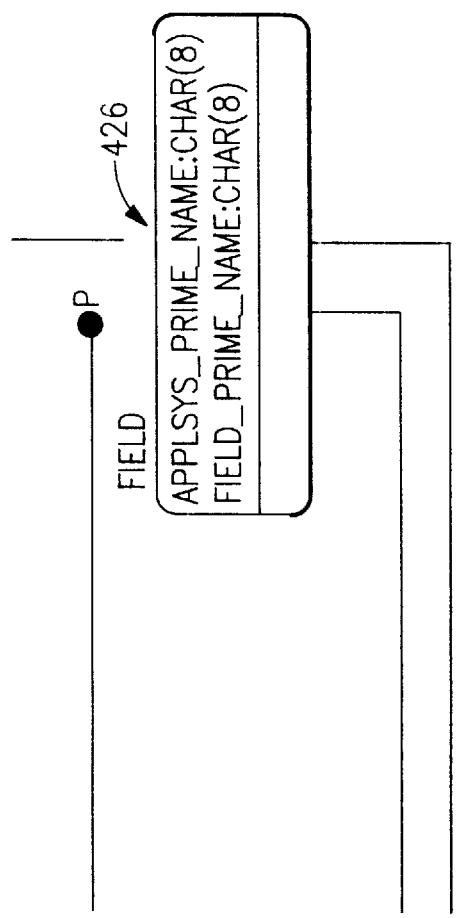

| FIG. 16A | FIG. 16B |
| --- | --- |
| FIG. 16C | FIG. 16D |

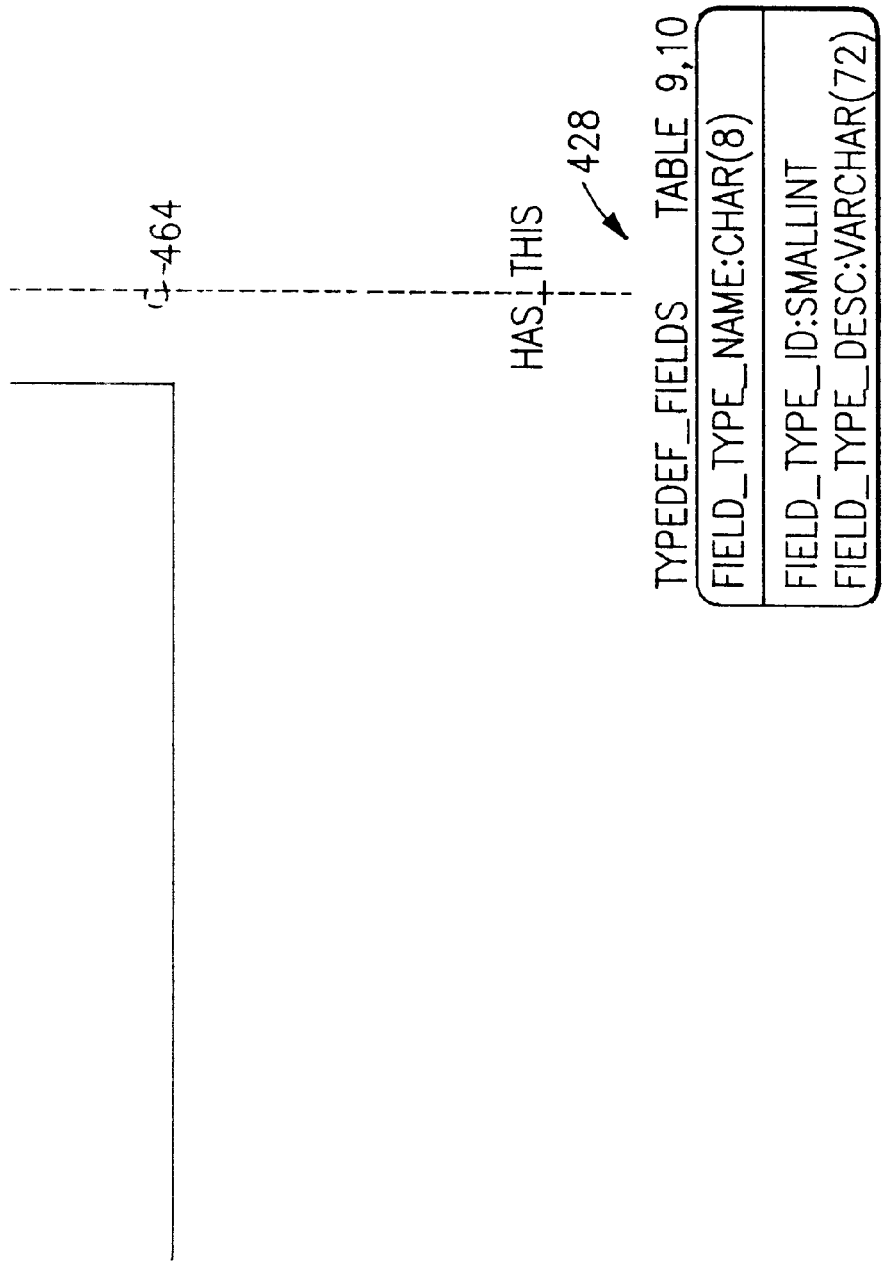

METHOD AND APPARATUS FOR GENERATING A USER INTERFACE FROM THE ENTITY/ATTRIBUTE/RELATIONSHIP MODEL OF A DATABASE

BACKGROUND OF THE INVENTION

1. Technical Field of the Invention

This invention relates to a computer application system for generating a working user interface, and more particularly, to a design tool that generates such from the entities, attributes and relationships of a data model.

2. Background Art

There are currently many programs that help data modelers create valid models of business areas. See, for example, Logic Works ERwin Methods Guide, a publication of Logic Works, Inc., 1060 Route 206, Princeton, N.J. 08540 (Logic Works ERwin is part of power builder series where ER means entity relationship and win means windows), and Application Development Workbench (ADW) of Knowledgeware. See ADW Planning Workstation Basics User Guide, a publication of Knowledgeware, 3340 Peachtree Road, N.E. Atlanta, Ga. 30326 (currently doing business as Sterling Software).

There are also many tools available to assist user interface designers generate user interfaces. See, for example, the graphical user interface (GUI) facilities as provided in Systems Applications and Products (SAP) in Data Processing, a product of SAP America Inc, Philadelphia, Pa., IBM VisualAge for SmallTalk, IBM VisualAge C++ for OS/2, Hockware's VisPro Rexx, and Borland's Object Vision 2.0. However, if the data modeller and the user interface designer are not working closely together, the resulting application will be lacking in either usability or data integrity.

Thus, there is a need in the art for a facility which enables a user to avoid having to learn many complicated syntaxes, by allowing the user to design a database system at a user friendly interface, such as a graphical user interface. Such a user need not be required to read and understand the underlying data model.

Products currently available for automatically generating a user interface do so only for entities and attributes, and relationships are not automatically created and checked. A further problem with current products and practices is that usually a data model is written first, then the user interface is defined without, often, updating the data model. There is, therefore, a need to assure that as the user interface is developed, the underlying data model is updated—and fixing one automatically fixes the other.

Consequently, it is an object of the invention to provide an interface design tool that takes the entities, attributes, and relationships, with cardinality and optionality on data models, and generates therefrom a working user interface characterized by usability and assured data integrity. It is a further object of the invention to provide an interface design tool that directly accesses the entity, attribute, relationship (EAR) data model and generates an appropriate user interface.

SUMMARY OF THE INVENTION

This invention provides a method and data structure describing a database model with relationships in the user interface as first class, or dynamic, objects within the model itself—thus making relationships a part of the user interface along with entities and attributes, with referential integrity and cardinality resulting therefrom.

This invention further comprises a method and system which generates from an entity, attribute, relationship (EAR) data model a working user interface. It is a further aspect of this invention that missing entities, attributes, or relationships in the underlying data model are identified by use of the generated user interface, thus assuring completeness of the data model while maintaining the referential integrity and cardinality of the user interface.

Other features and advantages of this invention will become apparent from the following detailed description of the presently preferred embodiment of the invention, taken in conjunction with the accompanying drawings.

BRIEF DESCRIPTION OF THE DRAWINGS

FIG. 5 illustrates a normalized data model, and FIG. 6 illustrates a denormalized data model.

BEST MODE FOR CARRYING OUT THE INVENTION

As previously noted, there is a need in the art for a facility which enables a user to avoid having to learn many complicated syntaxes, by allowing the user to design a database system at a user friendly interface, such as a graphical user interface. Such a user need not understand, nor be required to access, the underlying data model to add, for example, an employee to a data base including tables of employees and salaries. Typically, an employee must have a salary. If the user enters a salary that is not on the grid, the system of the invention would not permit the addition of the employee until the required salary is defined. If it were possible to add an employee without a salary, there would be something wrong with the data model. The modeling tool of the invention will facilitate and assure validation of entries to tables of this type. Alternatively, entries to other types of tables are permitted. For example, it is permitted, in a typical case, to add salary schedules to a salary table even if an employee is not being added to the data base.

Figure 1:
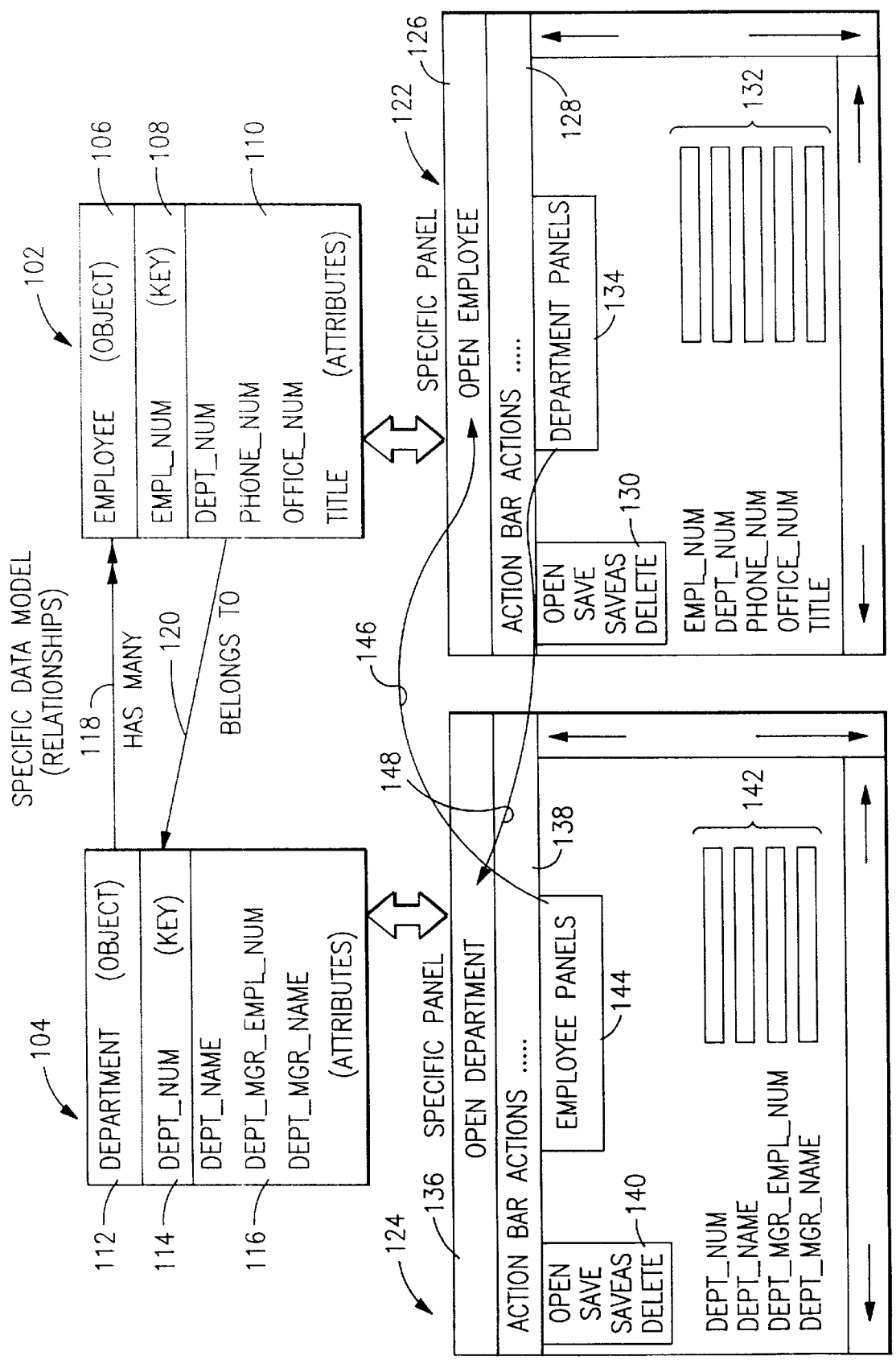
FIG. 1 is a graphical illustration of relationships in a specific data model and a representative corresponding graphical user interface.

Referring now to FIG. 1, by way of introduction to the modeling system of the invention, a description will be given of a typical entity, attribute, relationship (EAR) data model and a resulting user interface. A specific data model, which illustrates the concept of relationships, includes employee object 102 and department object 104. Employee table 102 includes object name 106, object key 108 and object attributes 110. Department table 104 includes object name 112, object key 114 and object attributes 116. Double arrow 118 indicates that department table 104 "has many" employee objects 102, and single arrow 120 indicates that employee object 102 "belongs to" department object 104. Thus, the relationship between objects 102 and 104 is defined by from and two fields within the two tables, in this instance, the Dept_Num attribute and Dept_Num key fields, respectively. (In this description, "table", "entity" and "object" may be used interchangeably.)

Referring further to FIG. 1, the specific panel displays 122 and 124 provide examples of graphical user interface (GUI) representations of the data model entities 102 and 104, respectively. GUI panel 122 includes title bar 126, action bar actions 128, pull down menus 130 and 134, and attribute fields 132. GUI panel 124 includes title bar 136, action bar 138, pull down menues 140 and 144, and attribute fields 142. The user may, by entering attribute Dept_Num in attribute field 132 and then activating department panel 134 bring up in window panel 124 the corresponding department panel, as is show by arrow 148, which corresponds to relationship 120 of the data model. Similarly, by entering a particular Dept_Mgr_Name into attribute field 142 and activitaing employee panel 144, employee panel 122 is brought into the display window.

Figure 2:
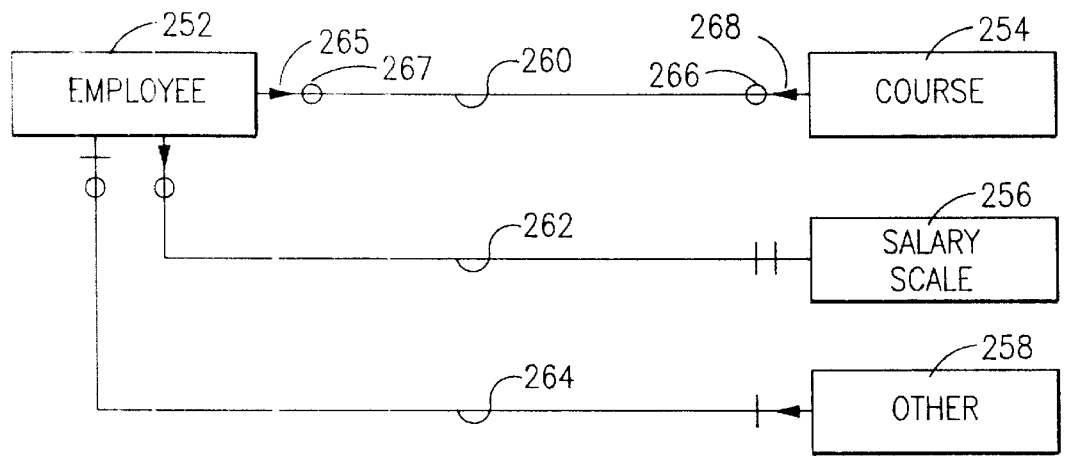
FIG. 2 is a block diagram illustrating the syntax used in the ADW database model.
Figure 3:
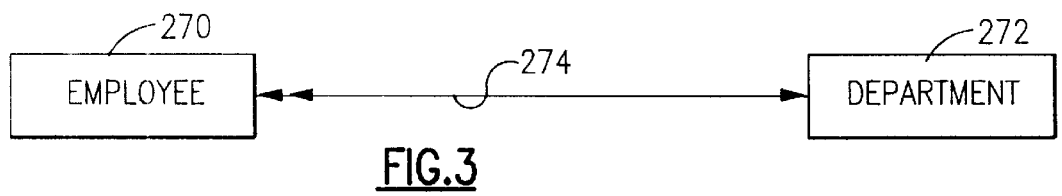
FIG. 3 is a block diagram illustrating yet another possible syntax for modeling a database.
Figure 4:
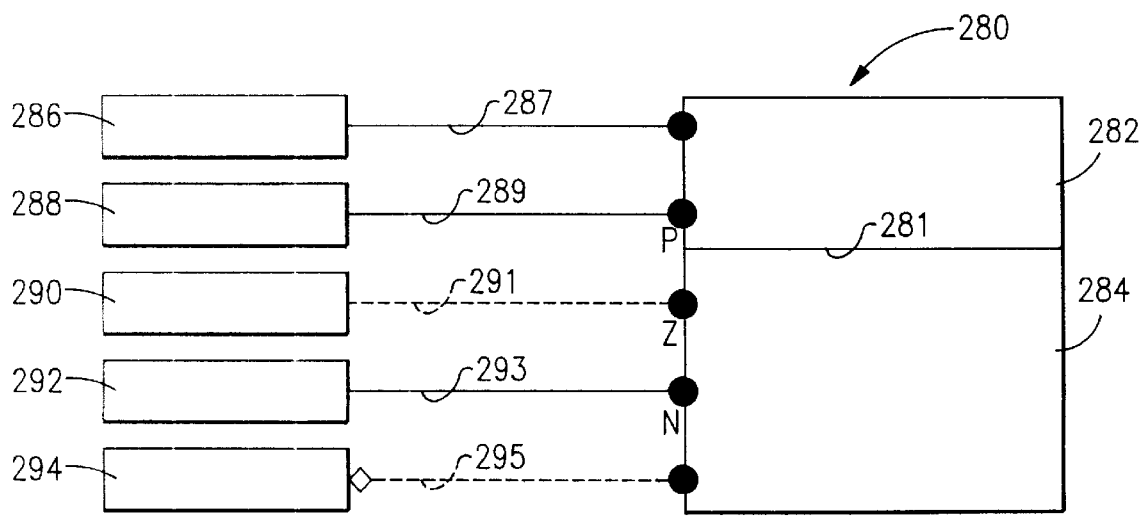
FIG. 4 is a block diagram illustrating the ERwin database model syntax.

Referring to FIGS. 2–4, various database modeling syntaxes are presented. First, In FIG. 2, the ADW syntax is illustrated, showing the cardinality relationships between employee table 252, course table 254, salary scale table 256, and other table 258. This is the syntax used hereafter in connection with FIG. 7. In accordance with the ADW syntax, relationships are illustrated by lines 260, 262, 264, with min/max and max/min designations 0, 1 and > representing the minimum and maximum cardinality values, zero, one, and many (one or more), respectively. Thus, as is represented by line 260, min 266/max 268 represent the view which employee table 252 has of course table 254; that is, each employee 252 may have enrolled in zero, one or many courses 254. Similarly, relationship 260 shows the view which course table 254 has of employee table 252, with min/max values 267/265 establishing that for each course 254 there may be zero, one or many employees enrolled. Similarly, the relationship 262 between employee table 252 and salary scale table 256 illustrates that an employee 252 may have one and only one (minimum=1 and maximum=1) salary scale, but each salary scale 256 may apply to zero, one or many employees 252. To complete the syntax representation, relationship 264 illustrates that an employee 252 may relate to one or many entries in other table 258, and an entry in other table 258 may have zero or one related entries in employee table 252, as is illustrated by relationship 264.

Figures 5, 6:
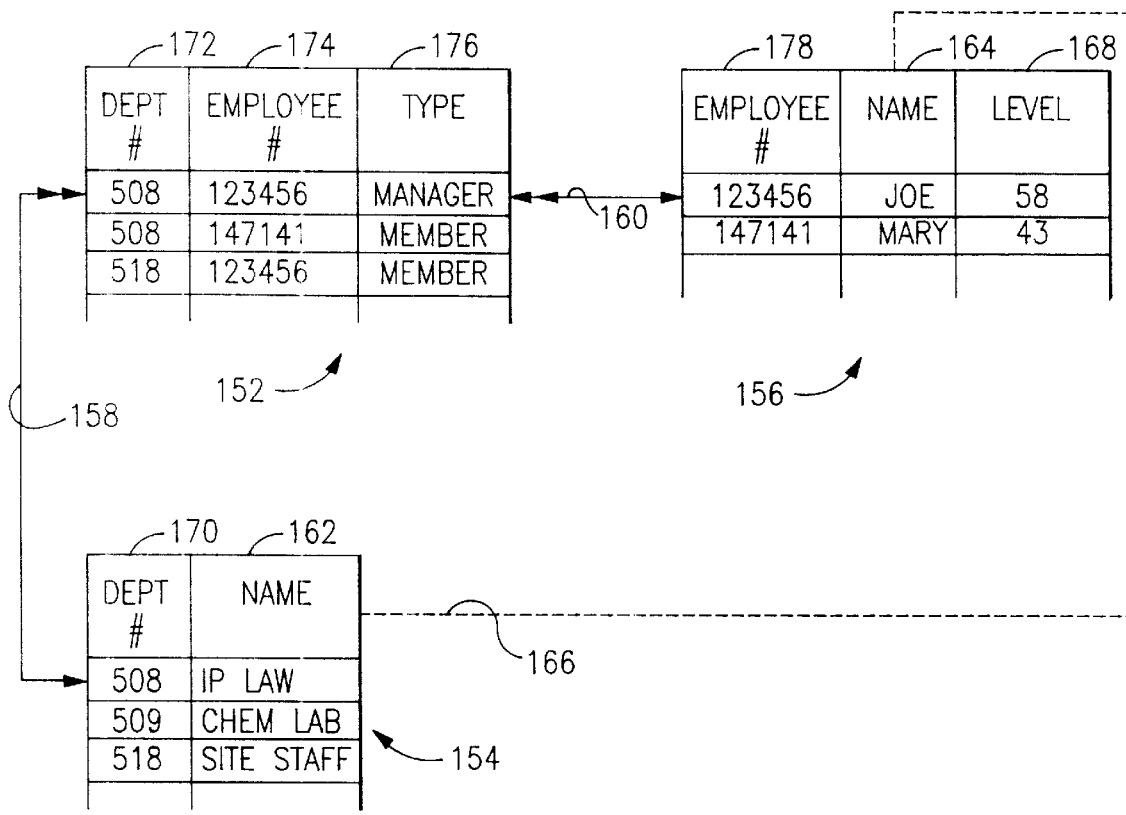
FIGS. 5 and 6 are graphical representations of relationships in a specific data model illustrating the concepts of normalization and data integrity.

Referring to FIG. 3, the relationship syntax used hereafter in the database model of FIG. 5 is shown. In this syntax, the single and double arrows on relationship 274 between employee table 270 and department table 272 represent, respectively, that an employee 270 may be a member of exactly one department 272, and department 272 may have many employees 270.

Referring now to FIG. 4, the ERwin syntax is illustrated for displaying cardinality with respect to database tables 280, 286, 288, 290, 292 and 294. This syntax will be used hereafter in connection with FIGS. 11–16, which set forth the modeling system of the invention.

An ERwin diagram may be viewed as a graphical language for expressing statements about a model wherein entities are the nouns, attributes are the adjectives or modifiers and relationships are the verbs. Herein, an entity is any person, place, thing, event, or concept about which information is kept. It is a set or collection of indiviudal objects called instances. Each instance must have an identity distinct from all other instances. With respect to a relational database, an entity corresponds to a table whose rows consist of possible instances of the entity and each column stores information about a certain property. These properties are the attributes of the entity.

In an ERwin diagram, the entity is represented by drawing a box 280 with the name of the entity on top and all of the attributes of the entity inside the box. The horizontal line 281 in the entity box divides the attributes into two sets: keys and non-keys (or, data). The area above the line is the key area 282, and the area below the line is the data area 284. The key is the set of attributes that identifies an entity. A key attribute is an attribute which, either by itself, or in combination with other key attributes, forms a unique identifier for an entity. Primary keys are placed above the line in the key area. A non-key attribute is an attribute which has not been chosen as a key, and is placed in the data area. Entity instances in an ERwin model are always identified by key attributes. Key attributes are chosen from a set of candidate key attributes, which are attributes, or groups of attributes, which can be selected as primary keys, and as a candidate key must uniquely identify each instance of the entity, and may have no part null, i.e., empty or missing. In choosing a primary key from the set of candidate key attributes, the data modeler trys to find an attribute which will not change its value over the life of each instance of the entity, is reasonably small, and is not an intelligent key. An intelligent key is a key where the structure of the digits in the identifer indicates groupings, locations, classifications, dates or the like. Candidate keys not selected as primary keys are designated as alternate keys, and the symbol AKn, where n is a number, is placed after those attributes which form the alternate key. Alternate keys are used to show different indexes the business will use to access the data.

Relationships represent connections, links or associations between entities. They are the verbs of a diagram showing how entities relate to each other. The relationship 1-to-many means that one (and only one instance) of the first entity is related or connected to many instances of the second entity. The entity on the 1-end is called the parent entity, and the entity on the many end, represented by a dotted end, is the child entity. The "many" in one-to-many as used herein means that there are zero, one or more instances of the child paired to the parent. When there is a one-to-many relationship both between parent and child and between child and parent, then a many-to-many relationship exists, and is represented by dots at both ends of the relationship line on a ERwin diagram. It is desireable in ERwin diagrams to eliminate many-to-many relationships in favor of one-to-many relationships.

The cardinality of a relationship expresses the number of instances of the child entity that participate in the relationship. Various symbols are used in an ERwin diagram to specify the number of instances, which may be one or more, zero or more, zero or one, or exactly N.

In accordance with the basic diagram syntax for relationships in an ERwin diagram, relationships are displayed as a line connecting two entities, with a dot on one end, and a verb phrase written along the line. In general, a relationship is read from the parent to the child using an active verb phrase, but this is not the case with associative entities (however, in this implementation, associative entities are not used). Verb phrases can also be read from the perspective of a child entity, as passive verb phrases. A generalization entity, also referred to as a generic parent, may be formed to represent information which is common across a plurality of entities. Cardinality is a property of relationships which defines how many of each participating entity of a relationship may, or must, participate. Cardinality statements designate how many instances of the parent child entity are connected to how many instances of the child. Thus, in the ERwin syntax, a relationship symbol near the dot on a relationship line displays cardinality in graphic form, according to the following notation:

| | | |
|---|---|---|
| _____ • | | One to zero or more 287 |
| _____ P • | | One to one or more 289 |
| _____ Z • | | One to zero or one 291 |
| _____ N • | | One to exactly N 293 |
| _____ ◊ | | Zero or one to many 295 |

In key-based and fully-attributed models, all relationships are (zero or) one to something. Any many-to-many relationships are broken down into a pair of one-to-many relationships.

Various terminologies are used in the literature to designate entities in a generalization hierarchy. For example, IDEF1X uses the term "category" to refer to the subtype or child of the generic parent. Others use the term "subcategory" for the child entity. In the ERwin syntax, category means sub-type or subcategory.

In hierarchical and network models, relationships are represented by pointer data structures at the physical level. In contrast, the relational model captures relationships with shared keys at the logical level. The modeling language of the ERwin diagrams of FIGS. 11–16 represents relationships by shared keys. Whenever entities in the ERwin diagrams are connected by a relationship, the relationship contributes a key, or set of keys, to the child entity. Foreign key attributes are primary key attributes of a parent entity contributed to a child entity across a relationship. The contributed keys migrate from parent to child, and are designated in the model by an (FK) following the attribute name.

Relationships may be identifying and non-identifying. In an identifying relationship, foreign keys migrate to the key area (above the line) and the keys of the parent form part of the identity of the child: the child is dependent on the parent for its identity. Identifying relationships are indicated by a solid line connecting the entities, with a dot on the child end. Non-identifying relationships are represented by dashed lines, and also connect a parent entity to a child entity. A non-empty subset of the foreign keys migrated by non-identifying relationships are placed in the data area (below the line). Since some or all of the migrated keys in a non-identifying relationship are not part of the primary key of the child, the child is not identified by the parent. This difference is relied upon in assuring referential integrity, by which the integrity of the relationship between parent and child is maintained during insertion, deletion and update operations.

Entities are designated as either independent entities, or dependent entities, depending on how they acquire their keys. Independent entities are represented in ERwin diagrams (FIGS. 11–16) by square corner boxes and do not depend on any other entity in the model for its identification. Dependent entities are represented by boxes with rounded corners, and depend both for their existence and for their identification on one or more other entities in the model. Relationships usually result in dependencies between parent and child. In existence dependency, the dependent entity cannot exist unless the parent does. In identification dependency, the dependent entity cannot be identified without using the key of the parent. Identifying relationships always result in both existence and identification dependency. Non-identifying relationships do not result in any identification dependency, as the migrated keys fall below the line, but may result in existence dependency.

A rolename is a new name for a foreign key attribute which defines the role that the attribute plays within the entity. A rolename declares a new attribute, whose name is intended to describe the business statement embodied by the relationship which contributes the foreign key. The syntax for role name is role-name.base-name, where the first part (before the period) is the rolename and the second part (after the period, or base-name) is the original name of the foreign key. Rolenames migrate across relationships just like any other attribute, but reach back across only one link of the relationship chain.

Non-identifying relationships contribute keys from a parent to a child, but some or all of the keys do not become part of the key of the child. Thus, the child is not identification-dependent on this parent. It is possible, also, that an entity at the many end of the relationship exists without a parent and, thus, is not existence-dependent. If the relationship is mandatory from the perspective of the child, then the child is existence-dependent on the parent. If it is optional, the child is neither existence nor identification-dependent with respect to that relationship (although it may be dependent in other relationships.) In ERwin syntax, a diamond, as on relationship line 295, is used to indicate the optional case. Diamonds can only exist for non-identifying relationships, since an identifying relationship contributes a primary key, and no part of a primary key can be NULL. Primary keys are keys which, according to the ERwin syntax, appear above line 281 in primary key area 282. Non-primary keys appear below line 281, in area 284. A non-identifying relationship 295 with a diamond is a zero or one-to-many relationship. If an attribute of an entity can be NULL, the relationship from the perspective of the child entity is optional, and is signified by a diamond at the parent 294 end of the relationship. Aside from the diamond, the cardinality graphics for non-identifying relationships are the same as those for identifying relationships.

Referring now to FIG. 5, a model will be described which illustrates a normalized database as well as an incorrect join. The database includes tables 152, 154 and 156. Table 152 includes columns for department number 172, employee number 174 and employee type 176. Table 154 includes columns for department number 170 and name 162. Table 156 includes columns for employee number 178, name 164 and level 168. The relationship between tables 152 and 154 is represented by line 158, showing that each row in table 154 may have zero, one or many entries in table 152; and each row in table 152 will have one entry in table 154. Similarly, as is illustrated by line 160, the relationship between tables 152 and 156 is such that for each employee 174 in table 152 there will be one entry in table in 156, but that each entry in table 156 may have zero, one or many entries in table 152. Relationship 166 illustrates an incorrect join, as is a problem with prior art systems which attempt to define relationships between tables based on column names. Such systems often incorrectly indicate identity between column headers having the same designation: in this case, name column 162 and name column 164 which, though having identical names, really refer to employee name 164 and department name 162.

Referring now to FIG. 6, not normalized data base 180 is illustrated, having columns department number 182, department name 184, employee number 186, employee name 188, employee type 190 and employee level 192. In such a not normalized data base, data redundency exists. In this example, such redundancy exists in department name 184, employee name 188, and employee level 192. A not normalized data base is subject to loss of data integrity, which will result if only one row is changed in a column having a redundant entry in another row in column 184, 188 or 192. Even if a data model is normalized, as in FIG. 5, a child could be created without a parent, or a parent deleted where a child still exists. It is a primary objective of this invention to implement relationships, and the parent/child checks that come with relationships, to assure data integrity.

Figure 7:
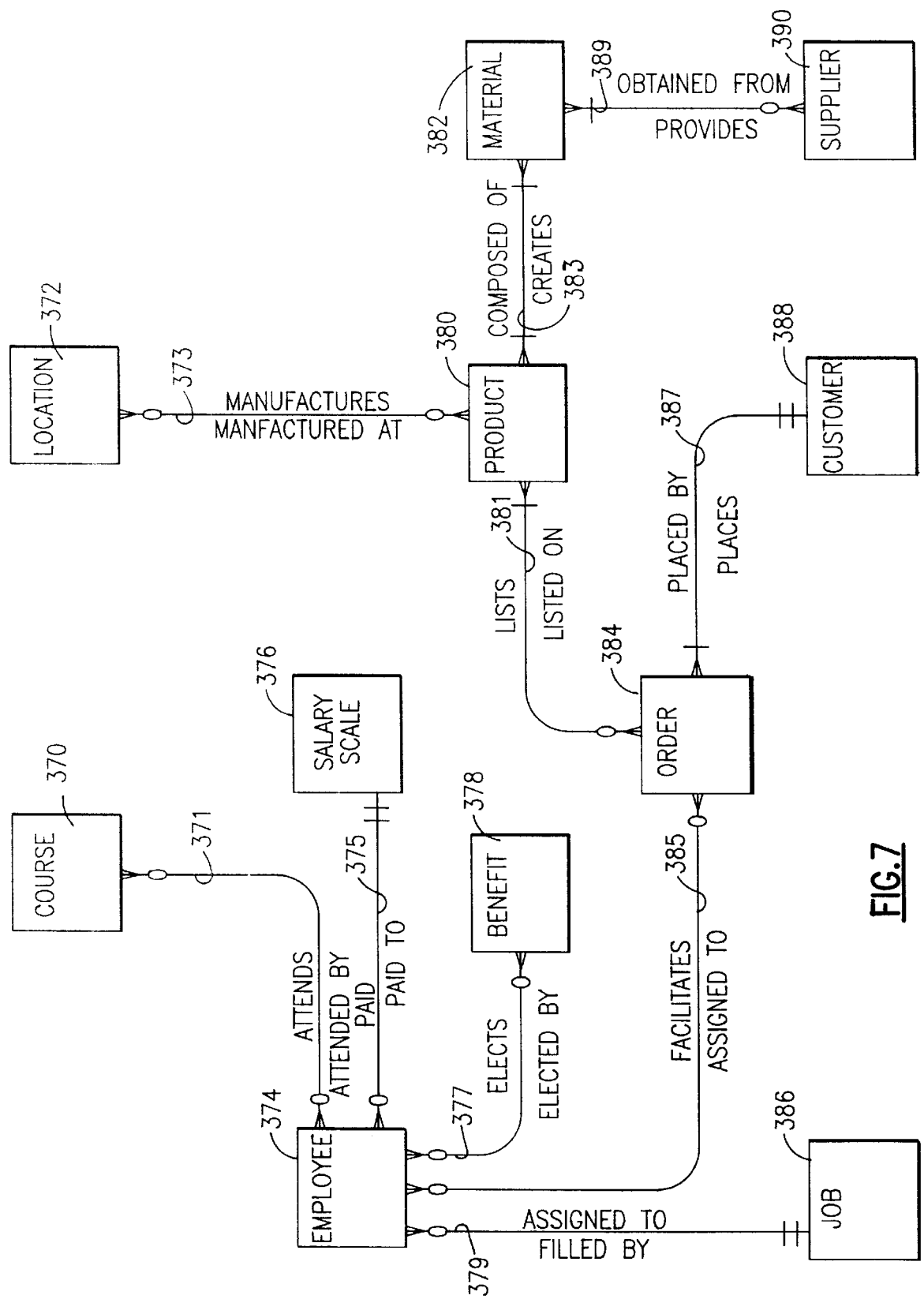
FIG. 7 is a block diagram illustrating a typical database model according to the ADW syntax.
Figure 8:
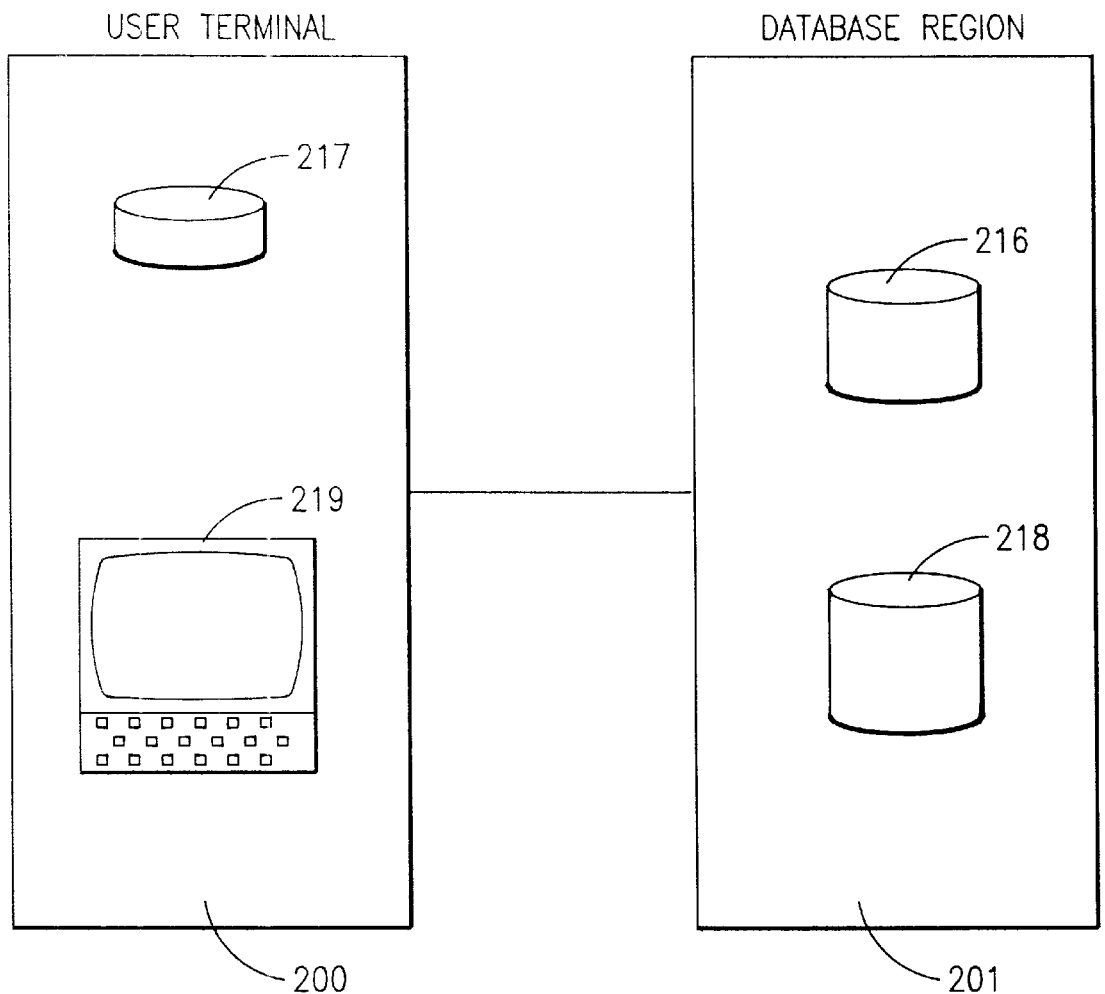
FIG. 8 is a block diagram illlustration of a typical system for implementing the model of the invention.
Figure 9:
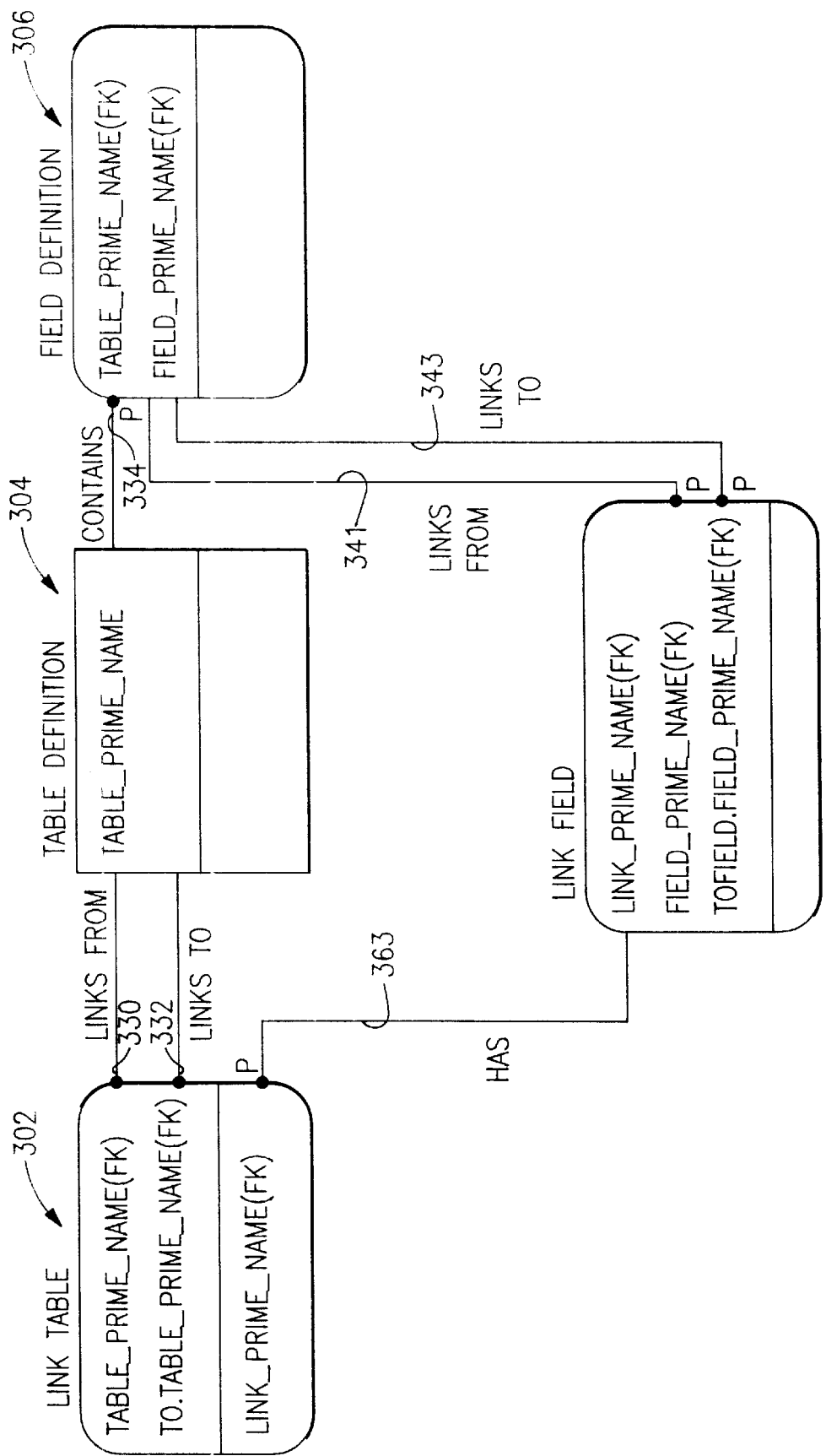
FIG. 9 is a graphical representation of the entity, attribute, relationship (EAR) model of the database model of an embodiment of the invention.

FIG. 7 is a model of a business enterprise, and its tables contain user data, such as is shown in FIGS. 5 and 6. FIGS. 8 and 9 illustrate a generic data model; that is, a process flow of how the modeling invention works against such an enterprise data model. FIGS. 11–16 represent meta data, a data model that describes data models, in this instance a data model describing the preferred embodiment of the invention.

Referring now to FIG. 7, yet another illustration of a data modeling system will be described. In the database model of FIG. 7, tables course 370, location 372, employee 374, salary scale 376, benefit 378, product 380, material 382, order 384, job 386, customer 388 and supplier 390 model a business enterprise. There relationships between these tables are represented by lines 371, 373, 375, 377, 379, 381, 383, 385, 387 and 389 as follows. Line 371 indicates that zero, one or many employees 374 may attend course 370, and course 370 may be attended by zero, one or many employees 374. Relationship 375 indicates that each employee 374 is paid according to one and only one salary scale, and that each salry scale may be paid to zero to many employees. Relationship 377 indicates that each employee 374 may elect zero to many benefits 378, and each benefit 378 may be elected by zero to many employees 374. Relationship 379 indicates that an employee 374 is assigned to one and only one job 386, and each job 386 may be filled by zero, one or many employees 374. Relationship 381 indicates that each order 384 lists one or more products 380, and each product 380 may be listed on zero or more orders 384. Relationship 383 indicates that each material 382 creates one or products 380, and that each product 380 is composed of one or more materials 382. Relationship 385 indicates that zero or more employees 374 facilitate each order 384, and that each order 384 is assigned to zero or more employees. Relationship 387 indicates that each customer places one or many orders 384, and that each order is placed by one and only one customer. Relationship 389 indicates that each material 382 is obtained from zero or more suppliers 390, and that each supplier 390 provides one or more materials 382.

As previously noted, there are many and complex database modeling syntaxes. Just three of these are illustrated in connection with FIGS. 2 through 7. These are useful to data modelers as they create models of business areas. Similarly, there are tools in existance for assisting interface designers to generate user friendly applications. However, if the data modeller and the user interface designer are not working closely together, the resulting application will be lacking in either usability or data integrity. There is a need in the art for a modeling system that takes entities, attributes, and relationships (with cardinality and optionality on data models) and generates a working user interface.

Figure 10A:
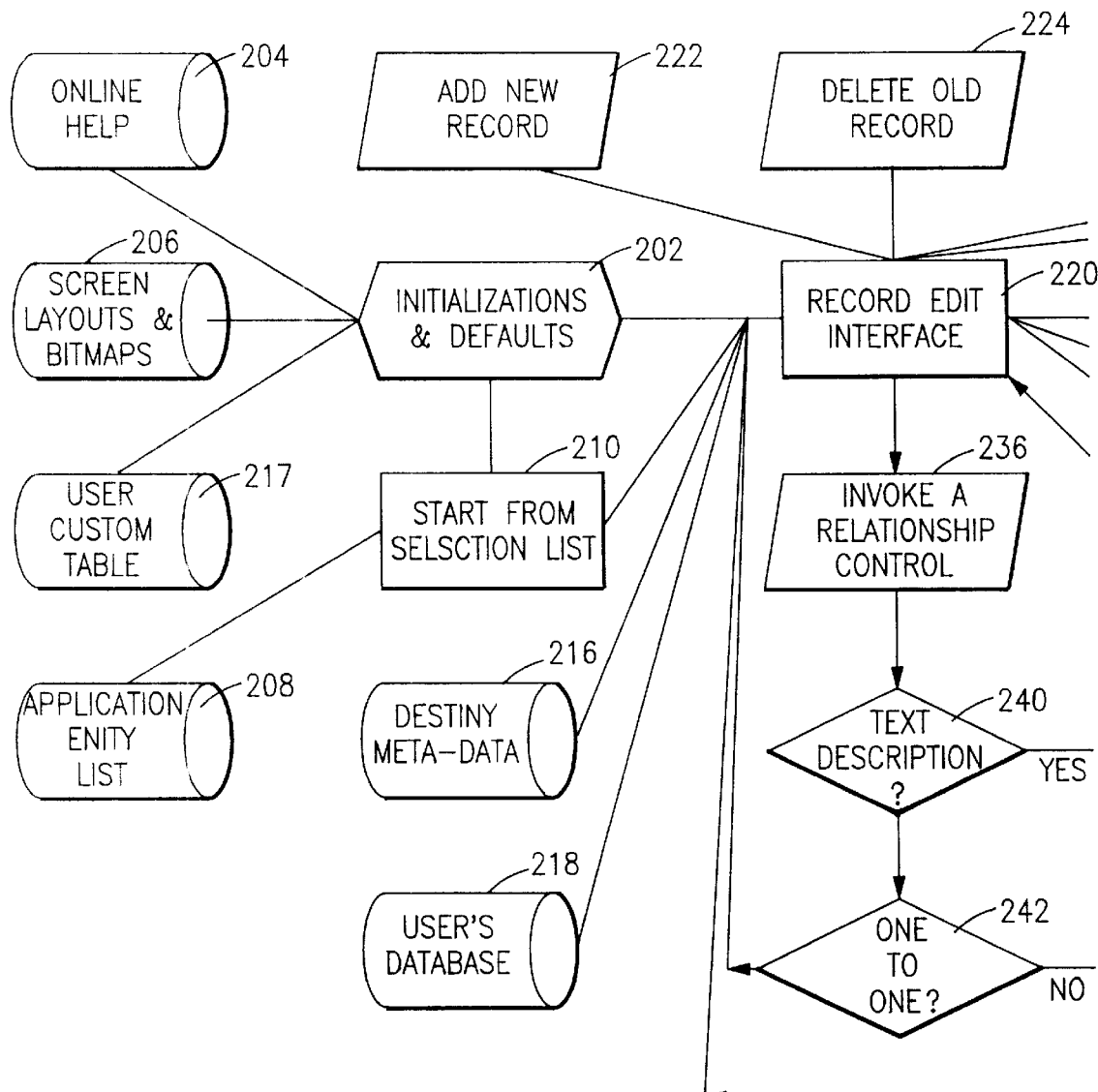
FIG. 10 is a block diagram illustration of the method of the invention for generating a graphical user interface from an entity, attribute, relationship data model.
Figure 10B:
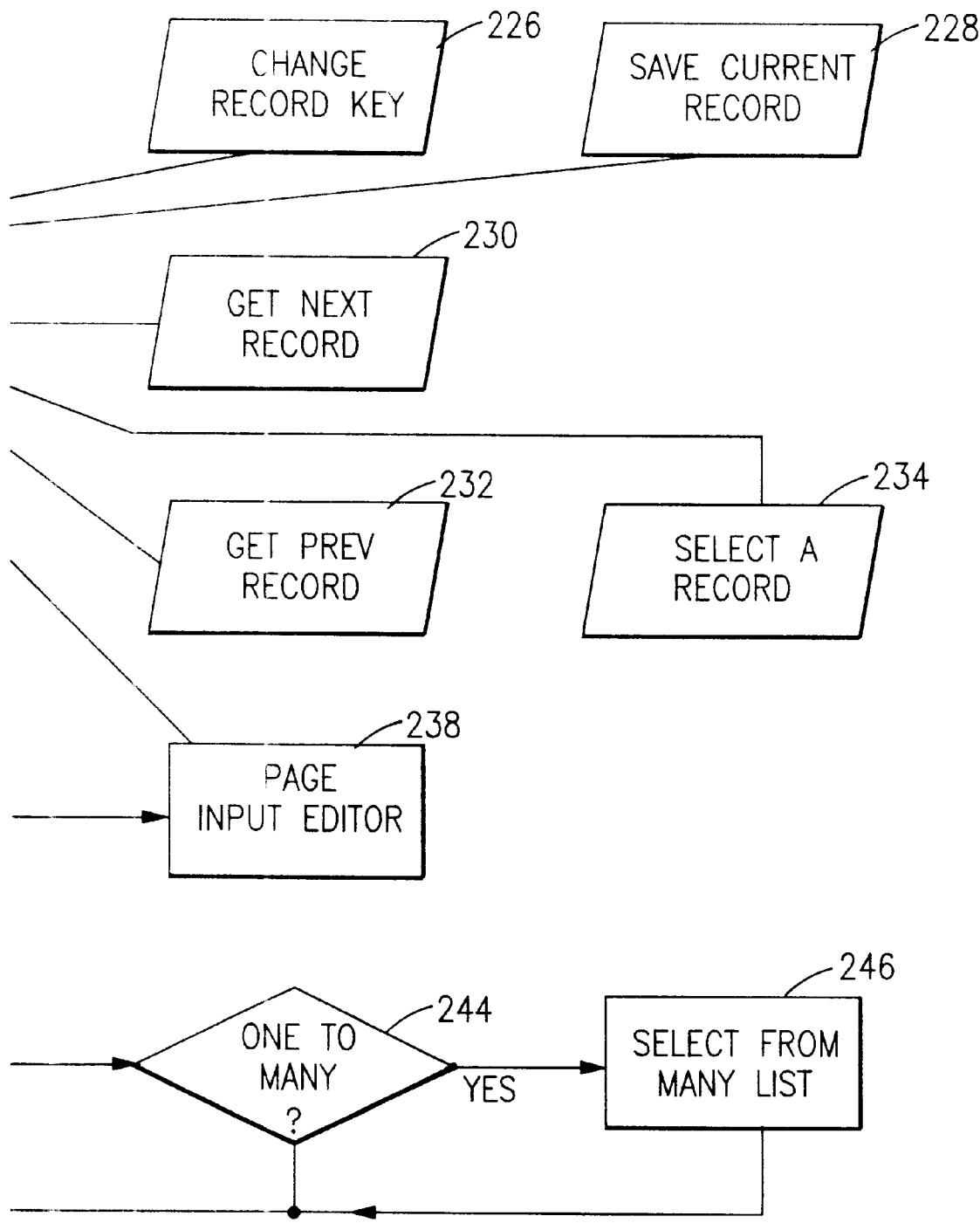

Referring now to FIG. 8 in connection with FIG. 10 (and hereafter with respect to FIGS. 11 through 16), the modeling system of the invention will be described. User work station 200 includes a terminal display and keyboard 219 and file 217. This is connected, such as by a local area network (LAN) to a central processor or server 201, which includes application code file 216 and data base files 218. In accordance with the invention, an application generator is created using an SQL interface written in C that works on OS/2 using Presentation Manager, over a LAN connection. For example, the application code in FIG. 10 is Presentation Manager code written in C that is closely related to OS/2 code 217 at terminal 200. It reads SQL tables in file 217 (or 216?) that describe the data model (providing pointers to database 218 and application code in FIG. 10), and then accesses the real physical tables 218 that contain application data. In one embodiment of the invention, entities are represented by OS/2 windows at display 219, and attributes are fields on that display. Relationships may be considered to be push buttons (for example, keys on keyboard, icons on display—there are many other ways to implement such relationships at the user interface).

Referring to FIG. 9, the essential entities of the preferred embodiment of the invention include Table Definition independent entity 304, Field Definition dependent entity 306, Link Table dependent entity 302, and Link Field dependent entity 324.

Table Definition independent entity 304 has primary key TABLE_PRIME_NAME and identify relationship links 330 and 332, with Link Table entity 302, 334 with Field Definition entity 306. Table Definition entity 304 links from one to zero or more records in Link Table entity 302, and links to one to zero or more such records; and contains one to one or more records in Field Definition entity 306.

Field Definition dependent entity 306 has primary keys TABLE_PRIME_NAME and FIELD_PRIME_NAME; identifying relationship link 334 with Table Definition entity 304, and identifying relationships 341 and 343 with Lind Field entity 324, and contains one to zero or more links from records in Link Field entity 324, and one to zero or more links to such records.

Link Table dependent entity 302 has primary keys TABLE_PRIME_NAME and TO_TABLE_PRIME_NAME; identifying relationship links 330 and 332 with Table Definition entity 304, and identifying relationship link 363 with Link Field entity 324; and contains one to one or more records in Link Field entity 324.

Link Field dependent entity 324 has primary keys LINK_PRIME_NAME, FIELD_PRIME_NAME and TO_FIELD_PRIME_NAME; it has identifying relationship links 363 with Link Table entity 302, and identifying relationship links 341 and 343 with Field Definition entity 306; such that each record in Field Definition entity 306 links from one to one or more records in Link Field entity 324, and links to one to one or more such records.

In operation, for setting up a new model we first identify the table prime names within the entity table definition. Next, we need to identify the field prime names within each table. The field prime names are in the field definition entity. Next, we need to identify every relationship between the tables in the table definition entity. These are entered in the link table entity, in the table prime name and to table prime name fields. Finally, for each link established we need to identify the related fields for each table and to table. These fields are field prime name and to field prime name for each table/to table combination entered in the link field entity. At this point, the meta data file 216 is established for a particular application, insofar as required to establish relationships as prime objects. Meta data file 216 describes the user data in user data base file 218.

Referring now to FIG. 10, a block diagram illustration of a preferred embodiment of the invention is described from the view of the user at terminal 200. In this embodiment, initialization and defaults block 202 references online help file 204, screen layouts & bitmaps 206, user custom table 217, and start from selection list 210. User custom table 217 provides data needed to initialize the operation of the data modeling/user interface generation sytem of the invention. Online help screens 204 provide instructions to the user, as may be needed or requested. Screen layout & bitmpas file 206 is unique to each data base 218, and provides the bitmaps and screen information required. Each database 218 is a unique model. FIG. 7 repesents one possible model, or map, of tables or entities that can be traversed by the user at terminal 219 in working with the data base 218. Application code in FIG. 10 provides definitions of entities, and these are selected by the user at terminal 219 as is represented by start from selection list 210.

From the user perspective, the user has workstation 200 with a file 217 containing pointers to his database 218 and meta data 216. Each user has a unique application region 201 containing his meta data 216 and database 218. When the code of FIG. 10 starts, initializations and defaults code 202 reads help file 204, gets the pointer to database 218, and reads the appropriate screen layouts and bitmaps 206. Control file 208 is the users personal pointer table which resides on his workstation 219 in file 217. Initializations & defaults routine 202 sets a working directory to user custom table 217, including database name, directory and default entities. These point to screen layout & bitmaps 206 and start up data base 218. User custom table 217 includes a default pointer defining for a given user where within meta-data file 216 to start processing, which would typically default to application system 316. Other examples of defaults include: personnel adding employees would start at employee (which would bring up on display 219 table 374 from FIG. 7, for example), and those users creating salary schedules would start by displaying salary scale table 376 (FIG. 7.)

Upon initialization 202, the user may choose start from selection list 210 to select an entity (that is, table) from application entity list 208, or such is selected automatically for the user from the default entry in user custom table 217. In either event, the entity selected is fed to record edit interface 220. Upon entering start from selection list 210, a list of applications (entities to select) is displayed at 219, and such a list could, for example, include the entire list of entities on FIG. 7, where each block 370, 372, 374, 376 ... represents an entity. A particular user may have access to some or all of such entities in his particular application.

Meta data file 214 includes code implementing the data model of the invention, using the meta data model described hereafter in connection with FIGS. 11–16. Record edit interface 220, while preparing to display at terminal 219 an entity selected from user custom table 217 or applications entity list 216 by start from selection list 210, reads meta data model 216 to determine which relationships exist for that entity, and the attributes for that entity, as will be described hereafter in connection with FIGS. 11–16. Once read from meta data model 216, record edit interface 220 populates display 219 with the information required for a particular entity, such as employee panel 122 (FIG. 1) from data provided by an entry in table 102 (FIG. 1) or employee table 374 (FIG. 7).

Record edit interface 220 is further responsive to add new record key 222, delete old record key 224, change record key 226, save current record key 228, get next record key 230, get previous record key 232, and select a record key 234, and may pass control to invoke a relationship control 236. Invoke a relationship control 236 passes control to description test 240, which in turn accesses page input editor 238 on the yes branch and one to one test 242 on the no branch. The yes output of one to one test 242 passes control back to record edit interface 220, and the no output passes control to one to many test 244. The no output of one to many test 244 passes control to record edit interface 220, whereas the yes output passes control to select from many list 246 and thence as an open back to record edit interface 220.

Record edit interface 220 responds to an input from initializations & defaults 202 or start from selection list 210 selecting an entity for display accessed by select a record 234 which presents at display 219 a request for the user to enter a primary key 282 (FIG. 4.) These are the keys above line 281, according to the ERwin syntax; these are also shown in each of the entity tables of FIGS. 11–16. Referring to FIG. 1, for example, the primary key for the employee panel 102 is Empl_Num 108 and for the department panel 124 is Dept_Num 114. This request on screen 219 responsive to select a record key 234 provides the user the opportunity to select an existing record—not add a new one.

Keys 222–234 represent various functions which a user can do within an entity. To add a new record within an entity, the user must select add by key 222, which requires that the user provide a new primary key value. Similarly delete old record key 224 allows the user to delete a record identified by a specific primary key entered at terminal 219. Save current record key 228 commits the change entered in response to processing add new record key 222 or delete old record key 224 to user's data base 218.

Change record key 226 processes a request by the user to edit and change a primary key value. This is a touchy point in data bases, because everything is driven by the primary key(s). Usually, controls are in place to prevent changing such primary keys because there are many pointers to that key. In accordance with this preferred embodiment of the invention, change record key 226 initiates a global change, and all pointers to the record identified by the primary key being changed are accessed and updated. For example, if a primary key is a name, and person identified by that name marries, then the key would need to be changed.

In those instances where records are stored in user's database 218 in alphabetical, or some other such order, get next record key 230 and get previous record key 232 are provided for accessing the next and previous records, respectively.

In response to the identification of the entity selected, meta data file 216 is accessed to determine which relationships exist for it. There will be one control established at terminal 219 for each relationship defined in meta data file 216 for the selected entity. Just as each entity has one or more primary keys, relationships have keys that link entities. A control may be, for example, a push button, popup menu, icon, function key, number/enter key—whatever it takes to start an action.

In accordance with the invention, each user's database 218 will include one or more description entities (see, for example, table definition 304 and field definition 306, FIG. 11) and each relationship is given a type from a set including the type "description", as will be more fully described in connection with FIGS. 11–16. These entities include a description of a particular record containing information in a plurality of leafs, one leaf for each record, necessary to enforce the cardinality rules. In this embodiment, invoke a relationship control 236 checks the type of the relationship linking the entity selected to the entity displayed and, as shown at test 240, invokes page editor 238 if the relationship has type "text description". Page input editor 238 opens at terminal 219, allowing the user to enter to the description entity instructions which define the cardinality rules. Page input editor 238 uniquely numbers the lines of the leaf being edited thus providing keys to the lines of data in the description, closes out the window and returns control to record edit interface 220. Alternatively, the user may activate cancel 250 key 250 to return control to invoke relationships 236 without saving any changes made to the selected leaf of the description entity being edited.

Referring to FIG. 7 in connection with FIG. 10, by way of further explanation of the operation of this preferred embodiment of the invention, the user may activate a control at terminal 219 on the employee entity 374 to select salary scale entity 376. If a key for salary scale is a grid_id, there must be an attribute called salary_grid in employee entity. When the user invokes a relationship by selecting the specified control at terminal 219, invoke a relationship control 236 will, in this example, read grid_id from employee table 374, access salary scale table 376 to determine the salary scale for that employee, and because there will be one and only one such salary scale for the employee, set one to one decision block 242 yes. Thereupon, processing returns to record edit interface 220 which displays the selected salary scale at terminal 219.

On the other hand, if salary scale entity 376 has been selected for display at terminal 219, a relationship control may be provided for selecting employee entity 374. If the user invokes the control for employee at invoke a relationship control 236, it is possible for one to one decision block 242 to to be set "yes" if there is only one employee having that salary scale. This is possible if the user had scrolled to another grid before coming back that no employee would have the selected grid, and decision block 244 would be set no. However, it is most likely that many employees have the selected grid, so decision block 244 is set yes to "many", and select block 246 brings up, or opens, a selection of all employees that have that salary grid for display at terminal 219. The user would then select an employee by invoking select a record key 234 for that employee, and processing returns to display control record 220 for the selected employee.

Referring now to FIGS. 11–16, the method and apparatus of the invention will be described with reference to a series of ERwin diagrams. ERwin diagrams are made up of three main building blocks—entities, attributes and relationships. These are more fully described in Logic Works ERwin Methods Guide, a publication of Logic Works, Inc., 1060 Route 206, Princeton, N.J. 08540, as previously set forth in connection with the description of FIG. 4.

Figure 11A:
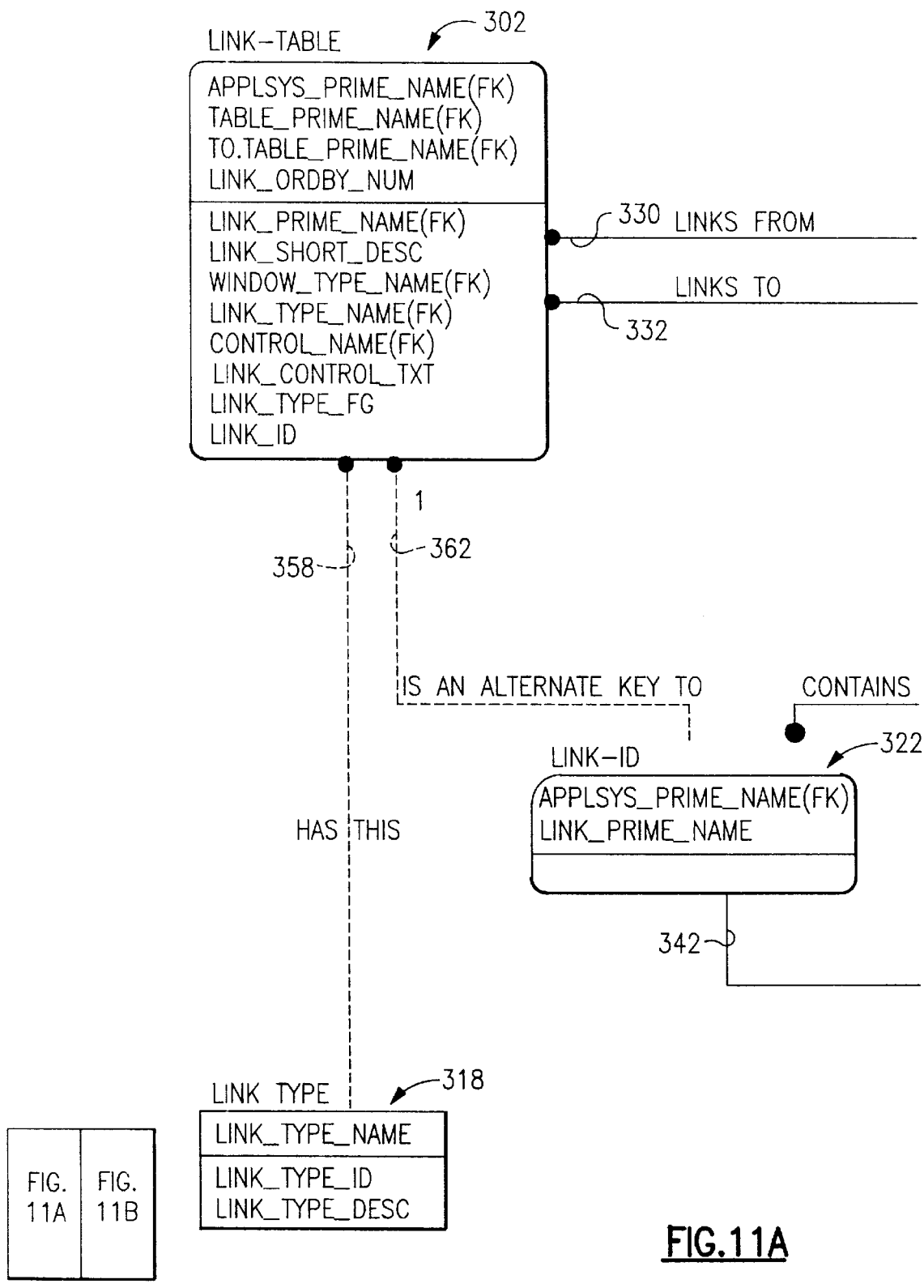
FIG. 11 is a graphical representation of the entity, attribute, relationship (EAR) model of the database model of an expanded embodiment of the invention.
Figure 11B:
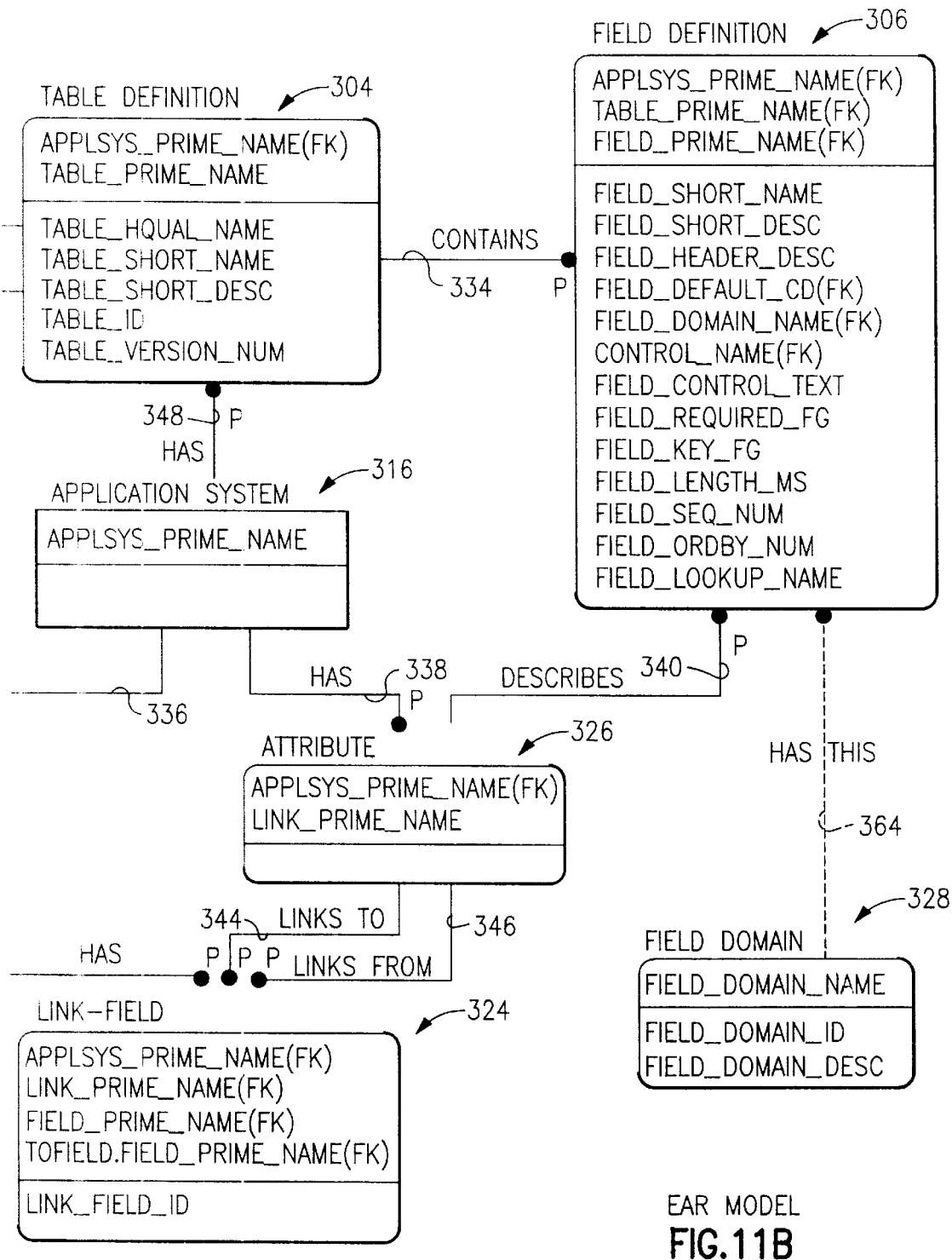
Figure 12A:
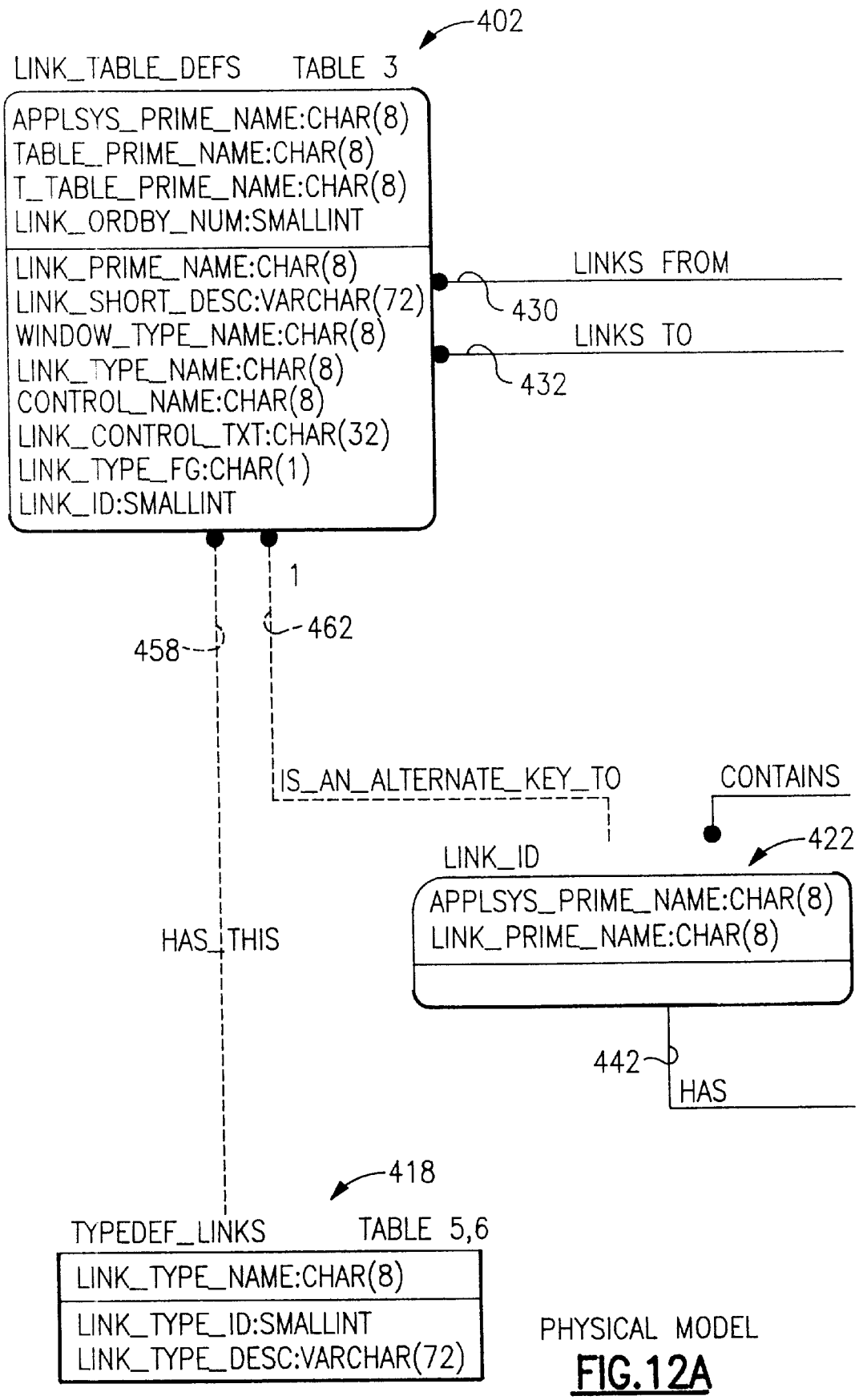
FIG. 12 is a graphical representation of the physical model corresponding to the EAR database model of FIG. 11.
Figure 12B:
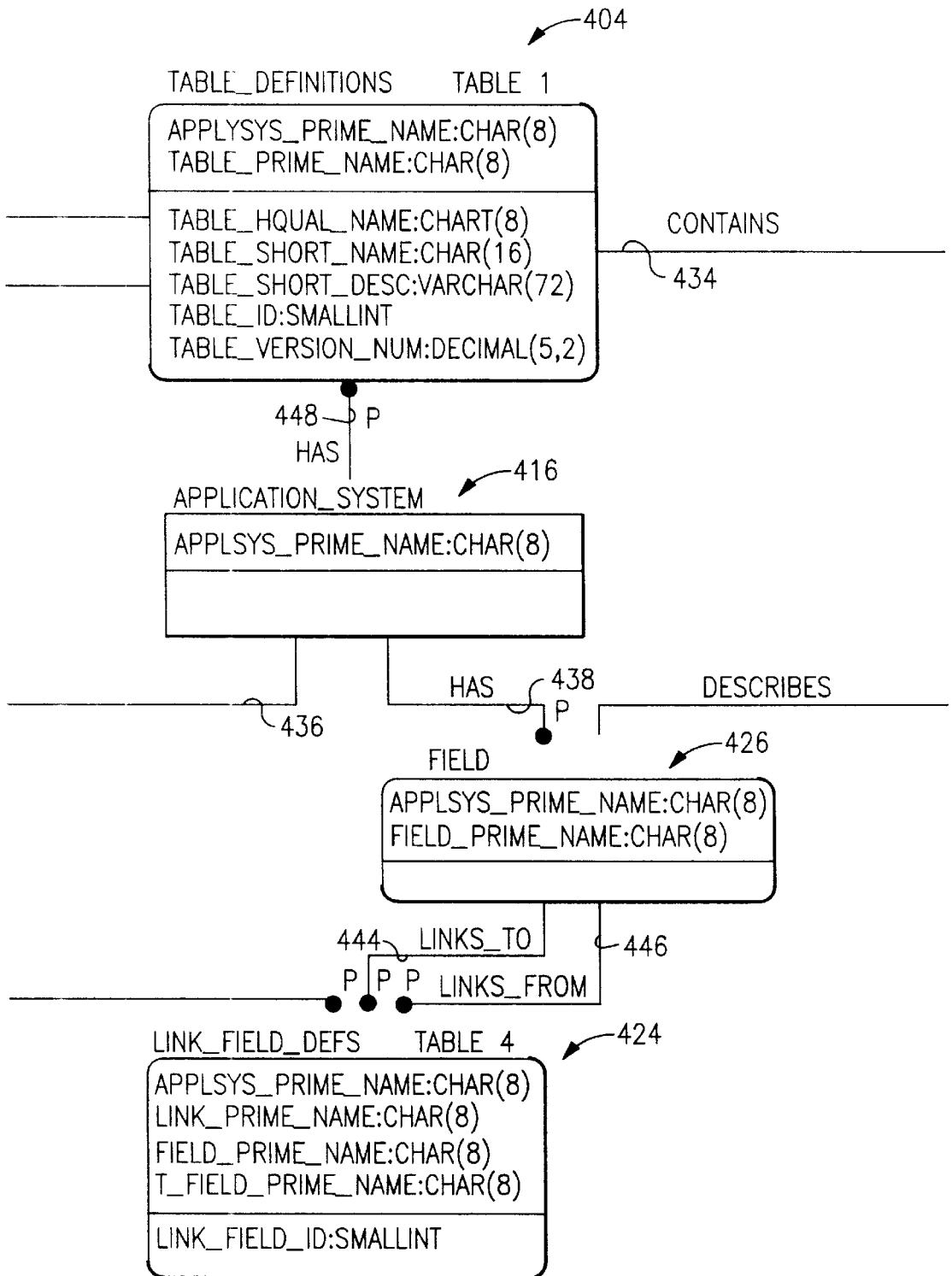
Figure 12C:
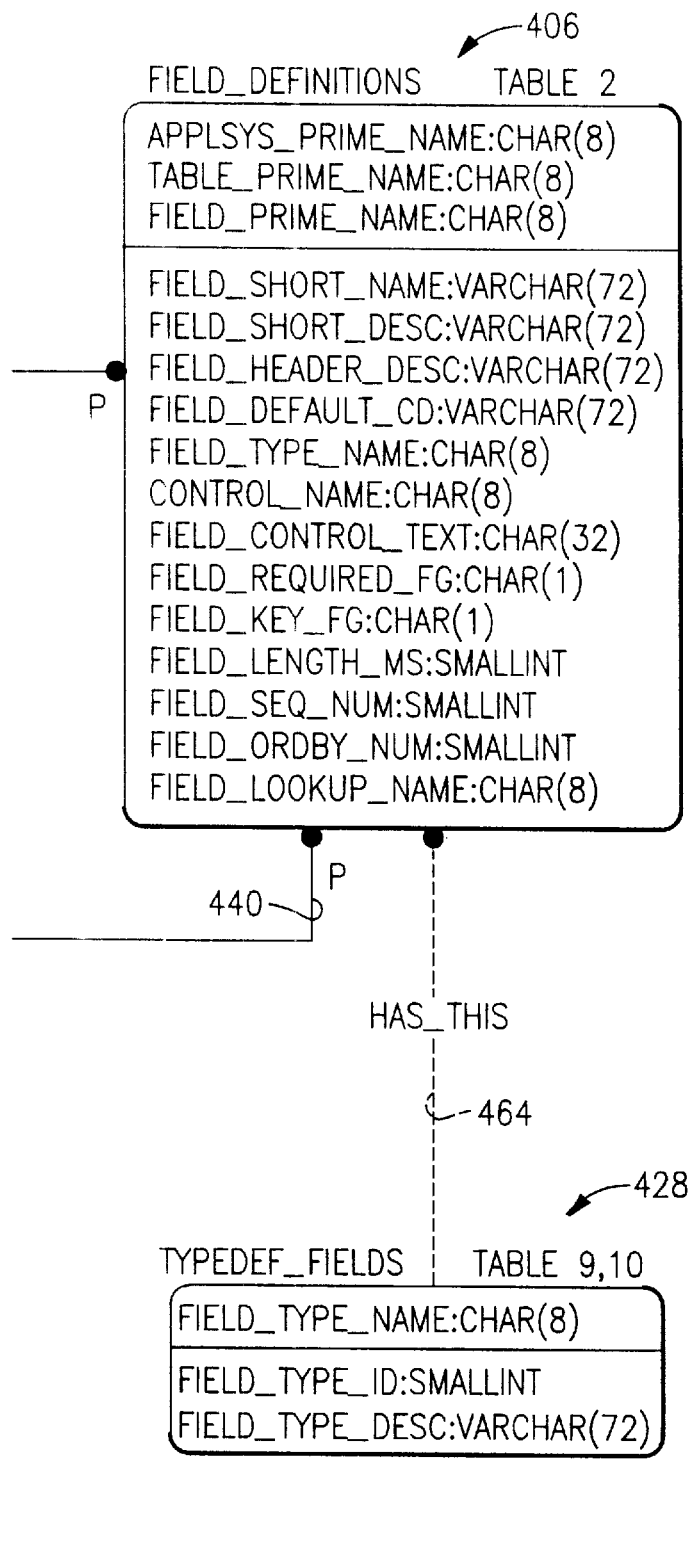
Figure 12:
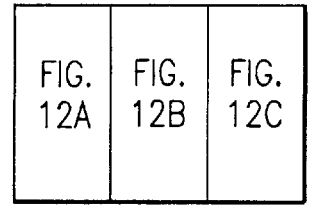
Figure 13B:
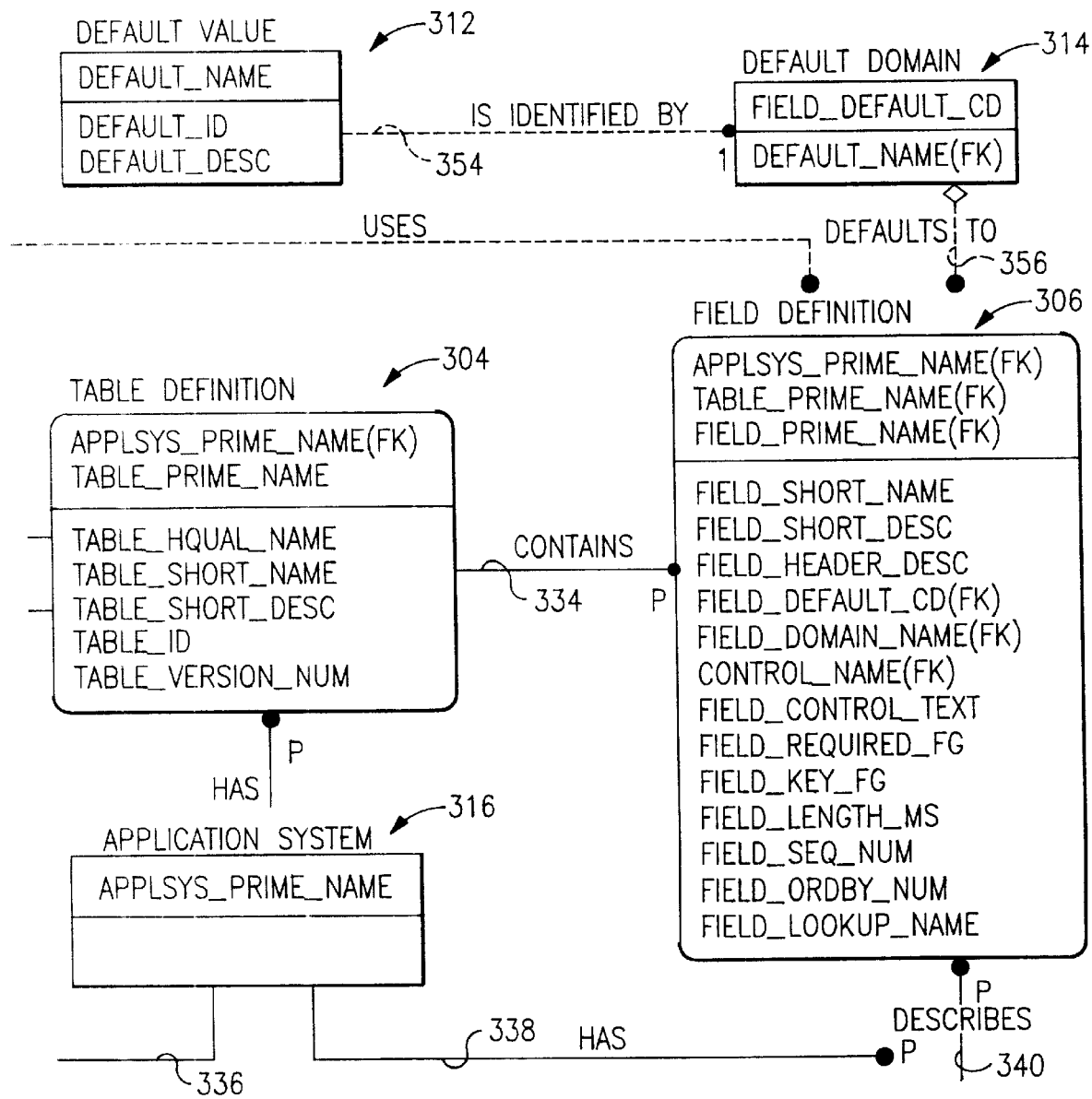
FIG. 13 is a graphical representation of the entity, attribute, relationship (EAR) model of the user interface model of a preferred embodiment the invention.
Figure 13C:
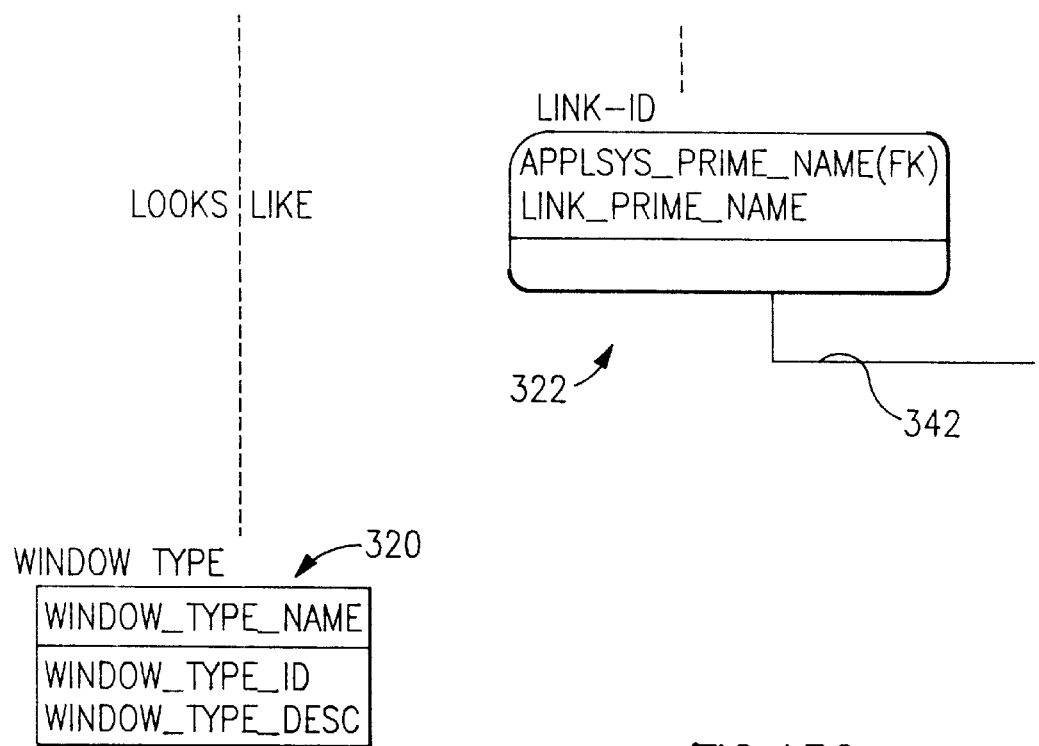
Figure 13D:
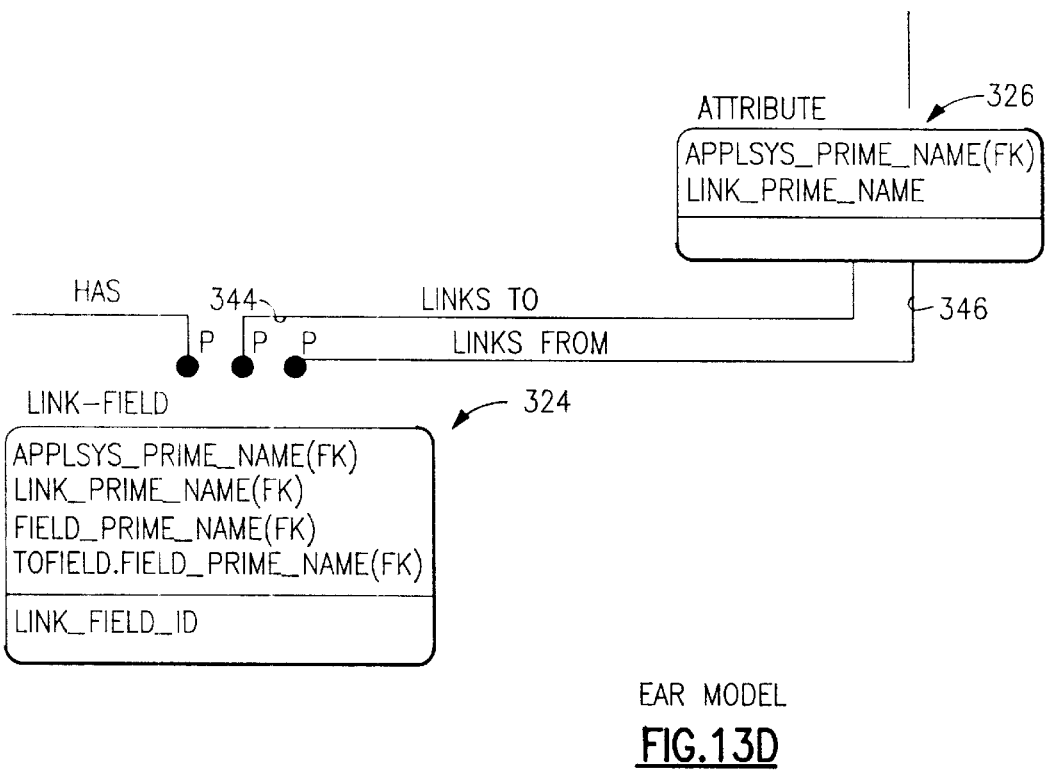
Figure 14A:
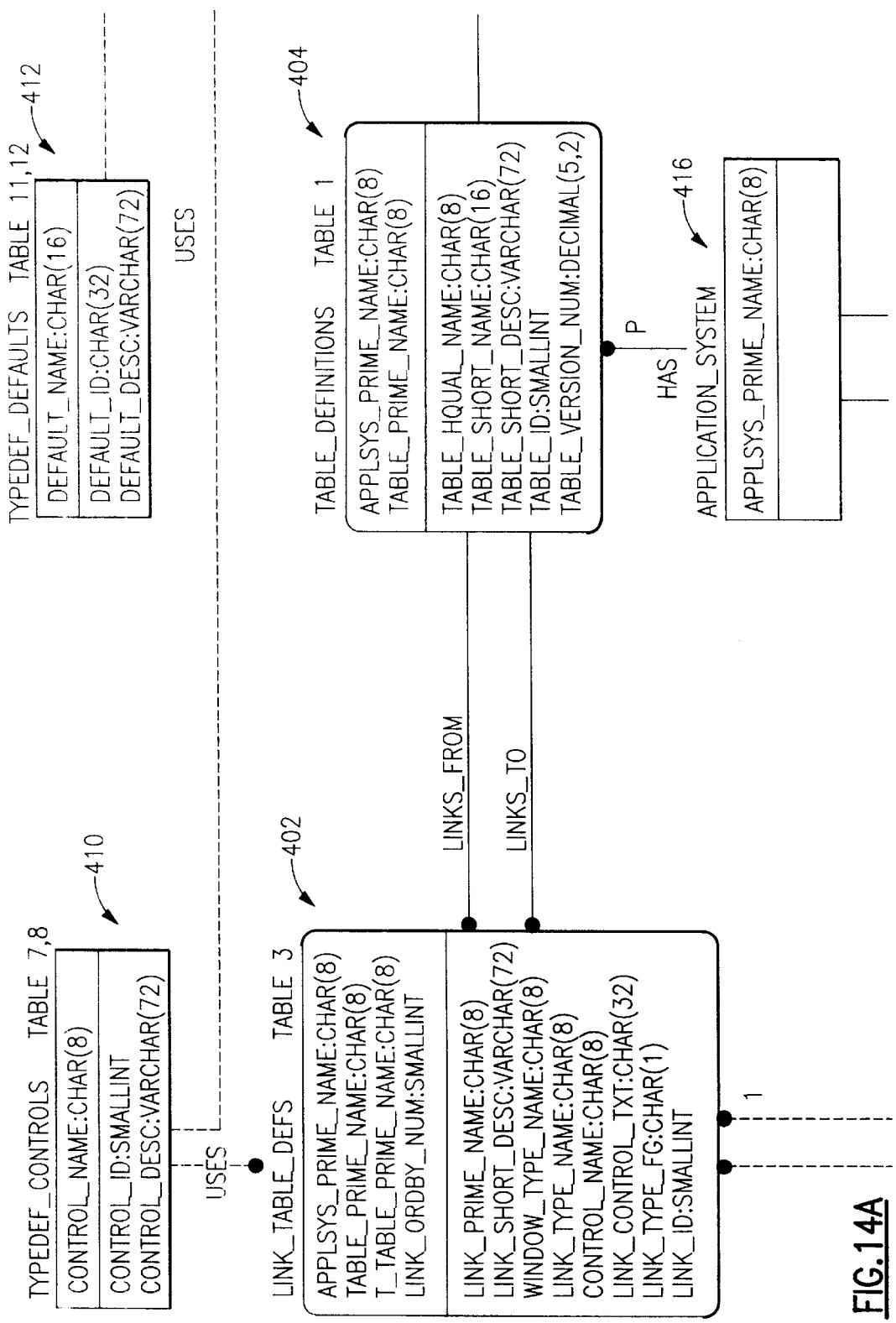
FIG. 14 is a graphical representation of the physical model corresponding to the EAR user interface model of FIG. 13.
Figure 14B:
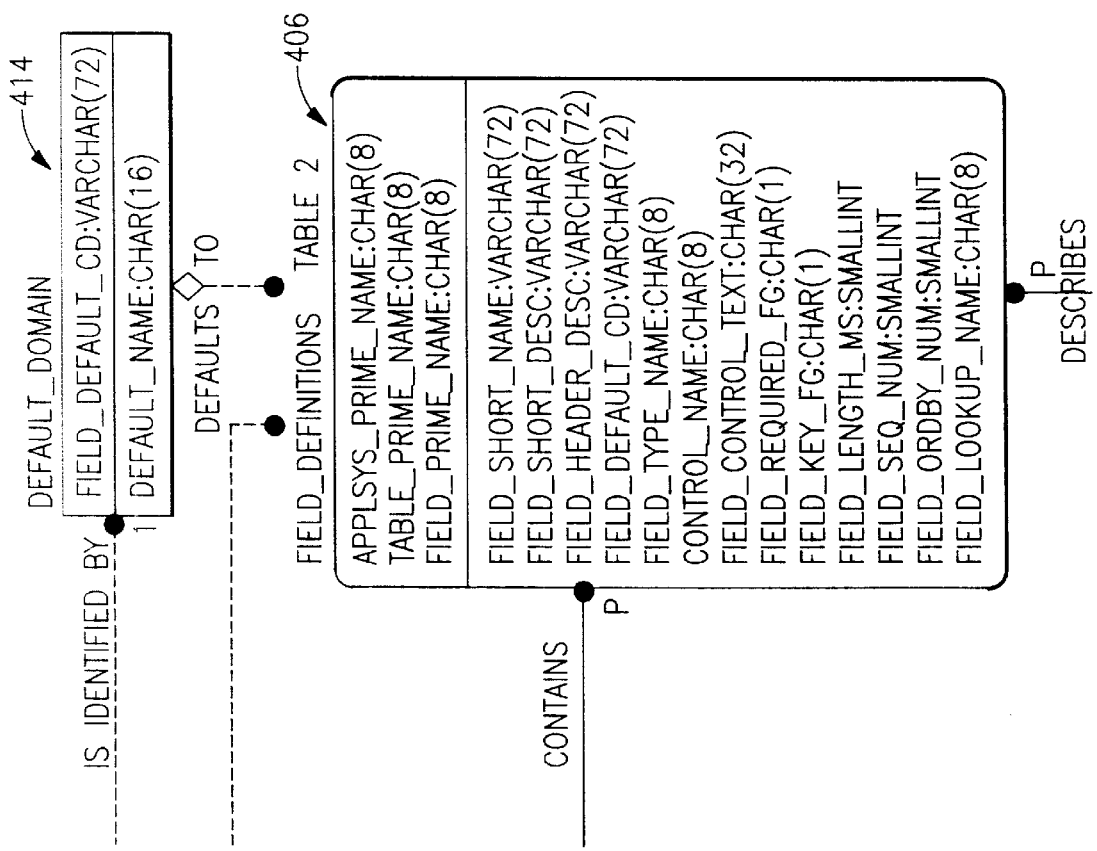
Figure 14C:
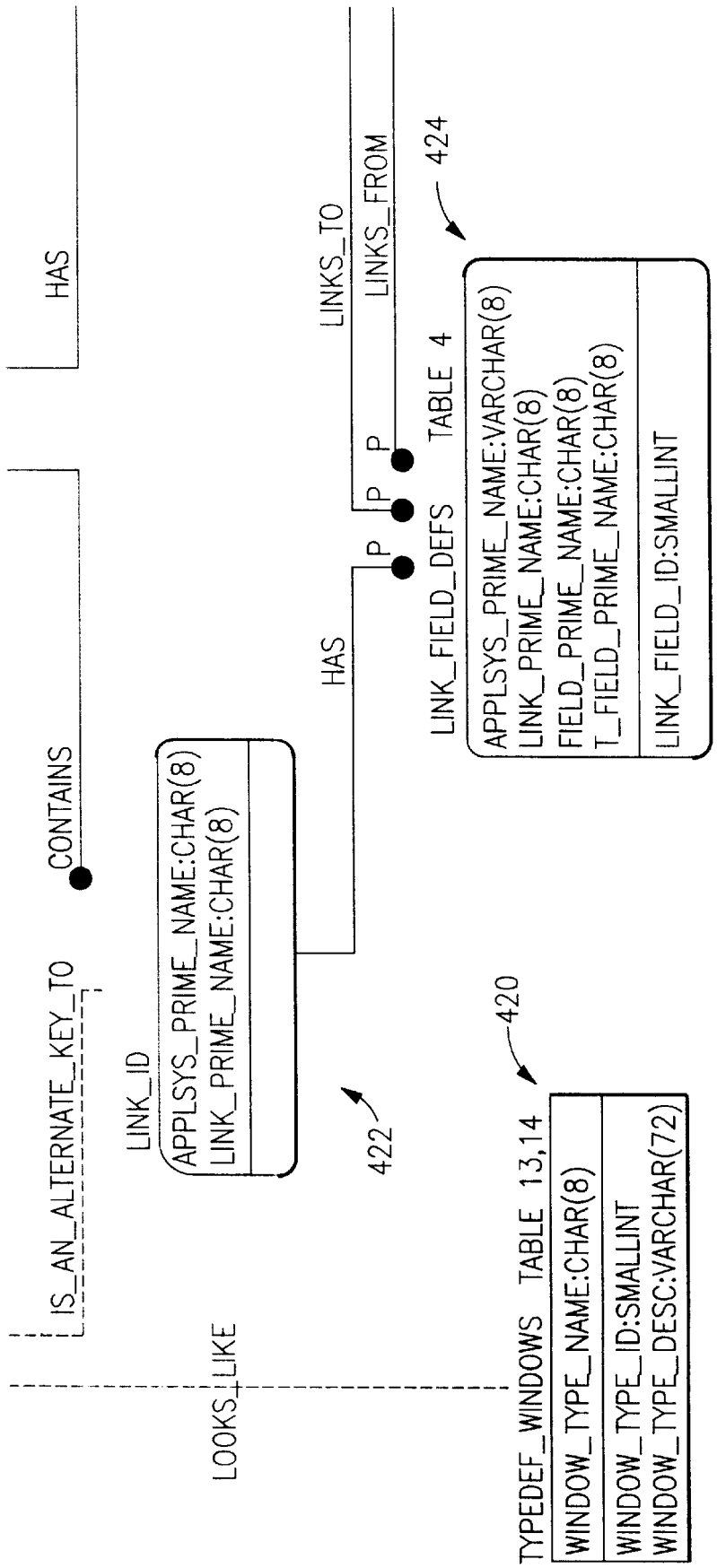
Figure 15A:
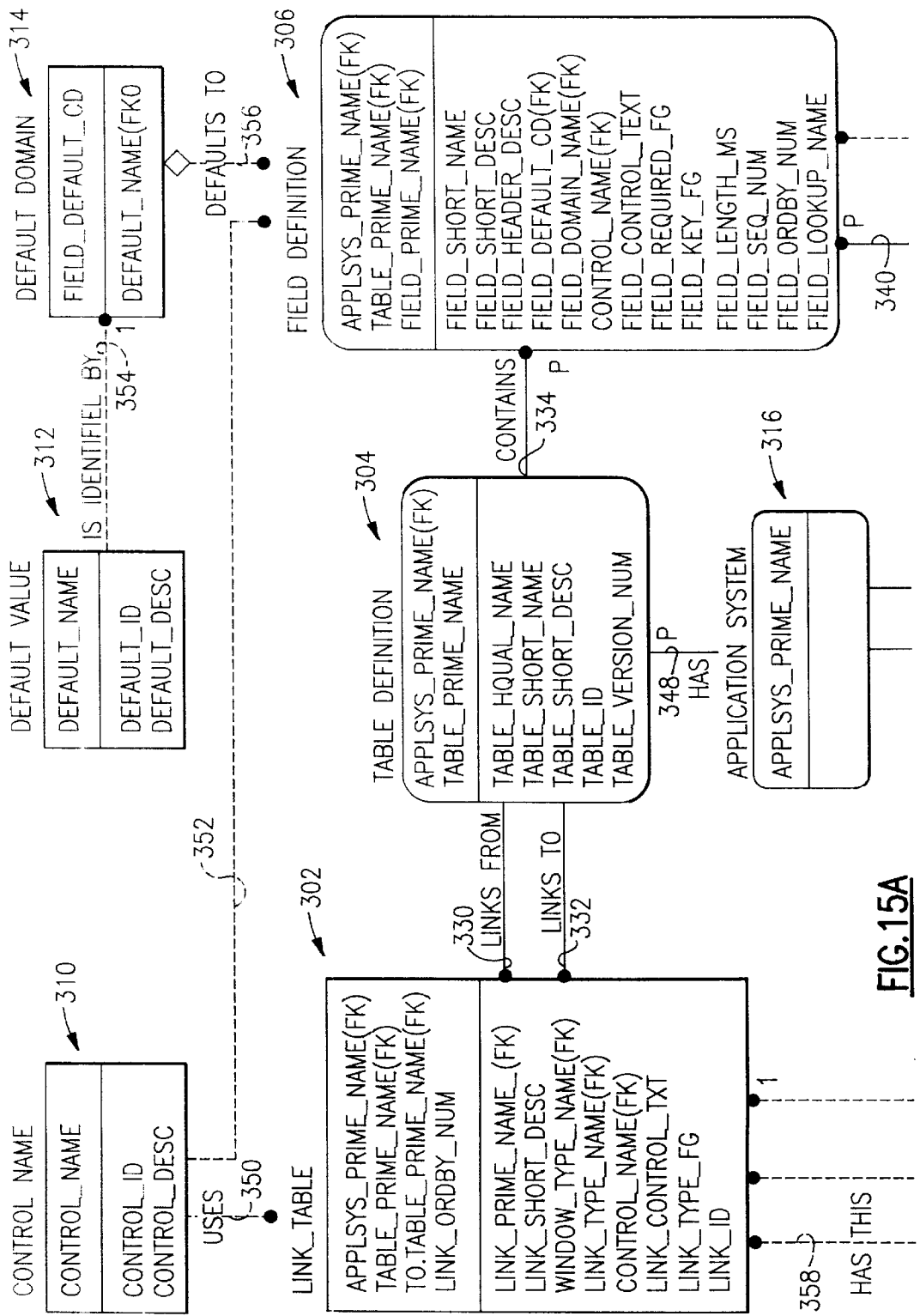
FIG. 15 is a graphical representation of the combined data base and user interface EAR models of FIGS. 11 and 13.
Figures 15, 15B:
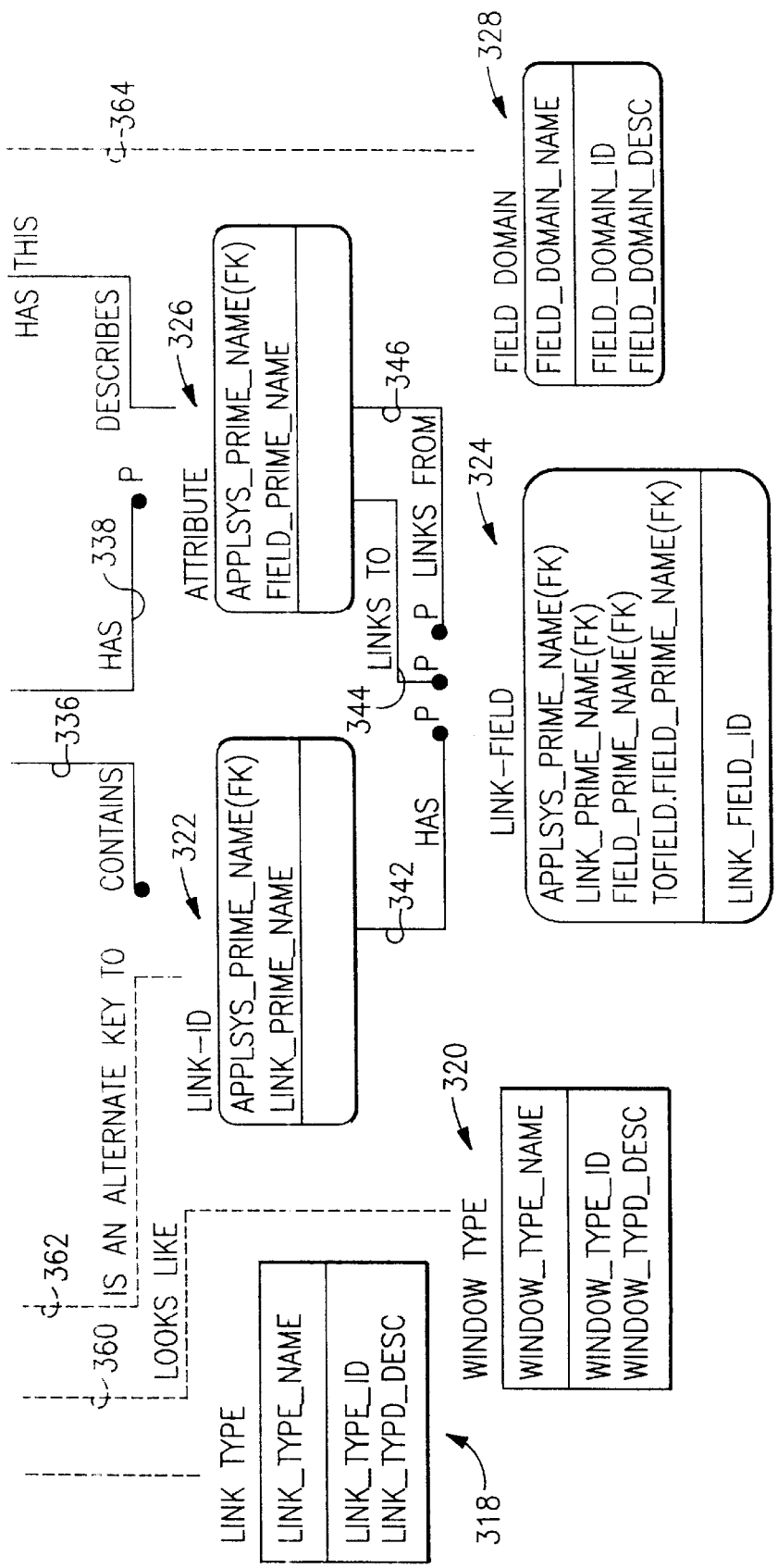
Figure 16A:
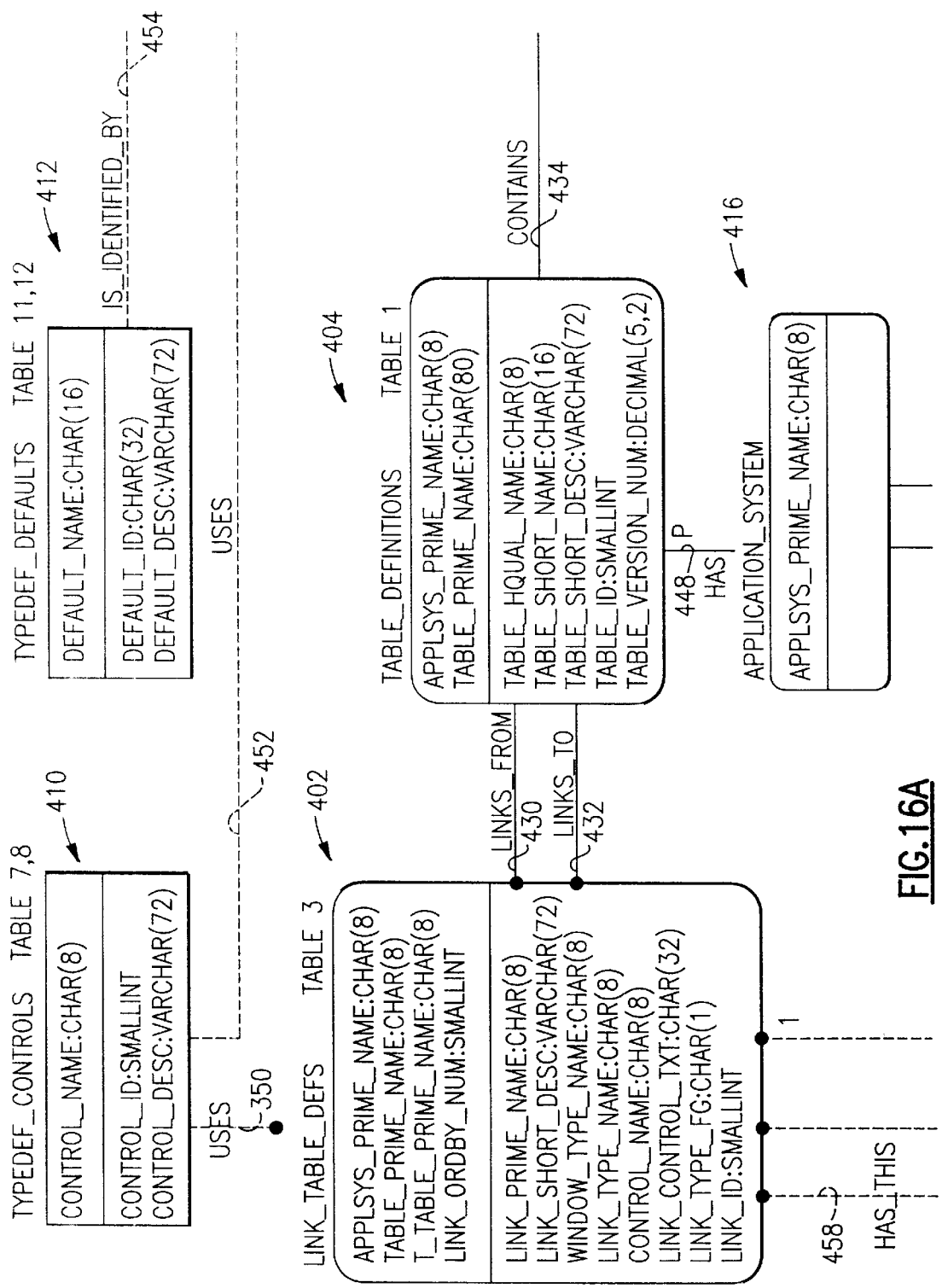
FIG. 16 is a graphical representation of the combined data base and user interface physical models of FIGS. 12 and 14.
Figure 16B:
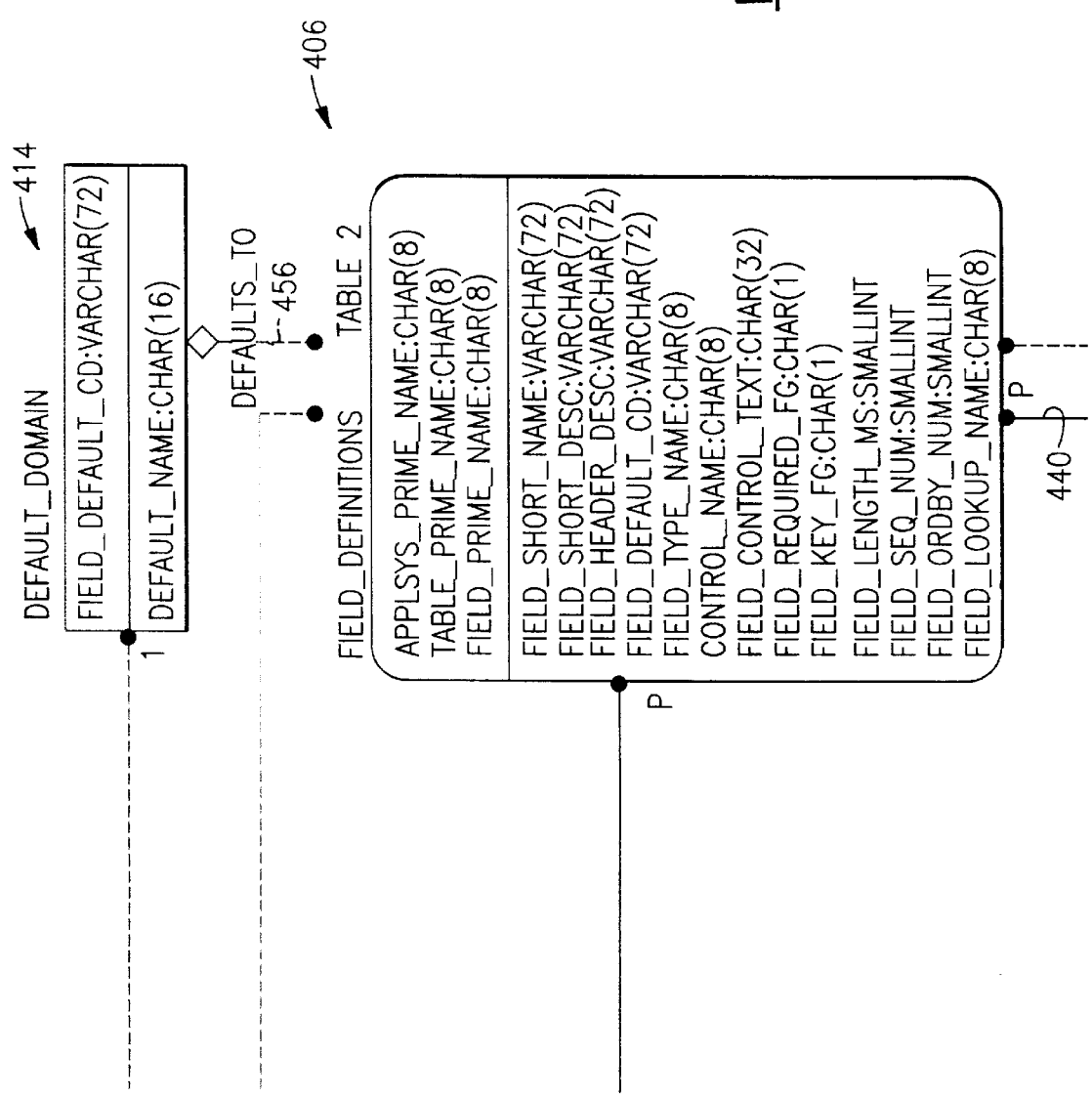
Figures 16, 16C:
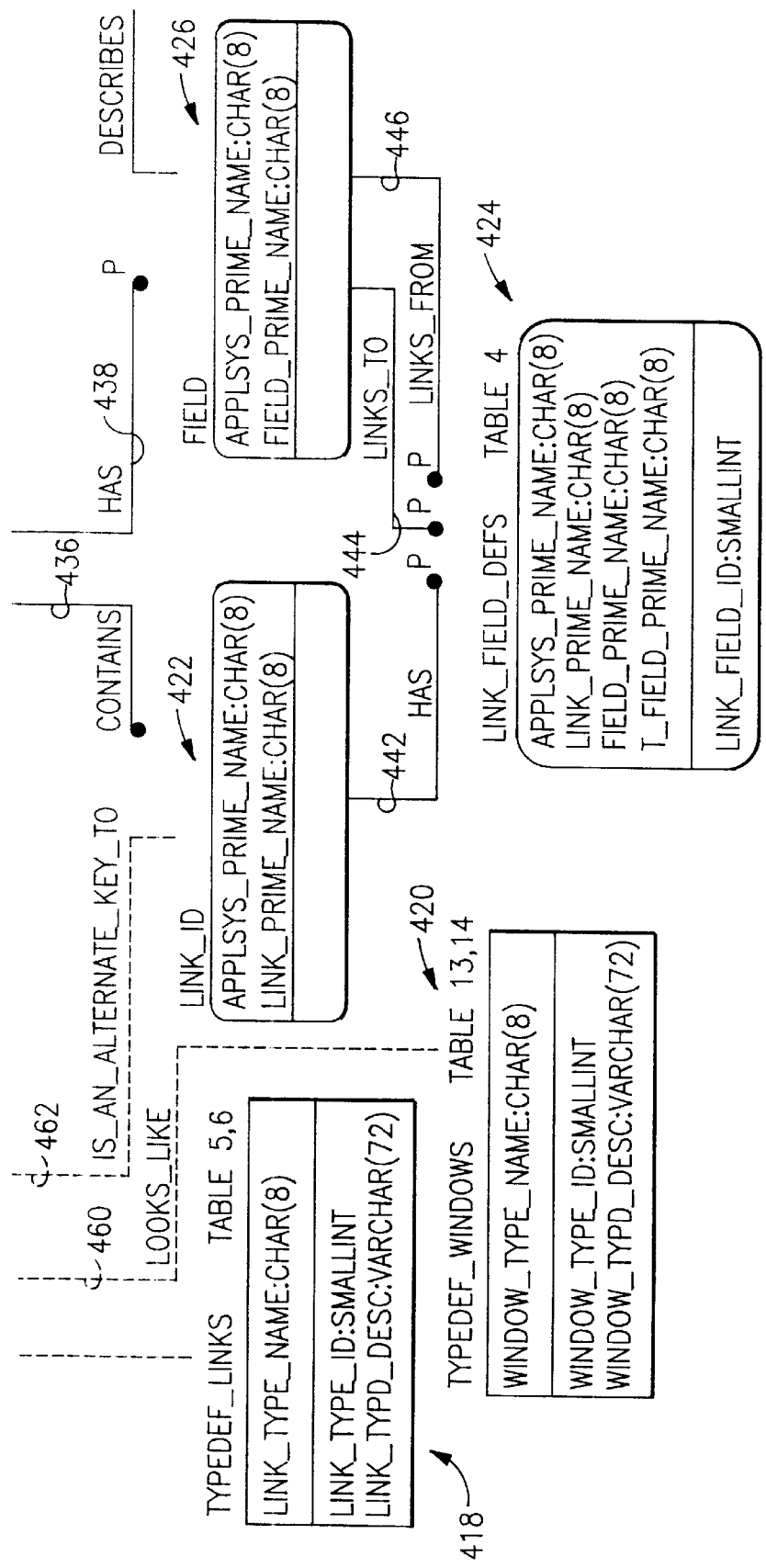

Referring now to FIGS. 11–16, the ERwin diagrams describing the preferred embodiment of the invention will be described. These FIGS. 11–16 include entity-attribute-relationship (EAR) models of FIGS. 11, 13 and 15 and physical models of FIGS. 12, 14 and 16. FIGS. 11 and 12 describe the database model. FIGS. 13 and 14 describe the user interface model. FIGS. 15 and 16 combine the database and user interface models. The EAR model contains contains the database model which describes the invention. A physical model describes an actual implementation of an EAR model of the invention for a given database, and includes table names, field names within tables, and their type and size. The relationships in a physical model are the same as in the EAR model. The user interface model describes the look and feel, which includes the type of control to be invoked, the type of window to be displayed, and the default values to be placed in the fields as the user defines a database model for some aspect of a business or other organization or process (such as the database example set forth in connection with FIG. 7) and thereafter works with that database to add, delete, change records or modify the database structure itself.

In the following description, references to "entities" generally will be to the entities or tables appearing in FIGS. 11–16, and references to "tables" will generally be to Tables 1–14, which describe the syntax and content of those entities in FIGS. 11–16. Inasmuch as FIGS. 15 and 16 contain all of the information contained in FIGS. 11–14, the following description will focus primarily on FIGS. 15 and 16.

Referring to FIG. 11, the essential entities of the preferred embodiment of the invention include Table Definition independent entity 304, Field Definition dependent entity 306, Link Table dependent entity 302, and Link Field dependent entity 324.

Table Definition independent entity 304 has primary key TABLE_PRIME_NAME and identify relationship links 330 and 332, with Link Table entity 302, 334 with Field Definition entity 306. Table Definition entity 304 links from one to zero or more records in Link Table entity 302, and links to one to zero or more such records; and contains one to one or more records in Field Definition entity 306.

Field Definition dependent entity 306 has primary keys TABLE_PRIME_NAME and FIELD_PRIME_NAME; identifying relationship link 334 with Table Definition entity 304, and identifying relationships 341 and 343 with Lind Field entity 324, and contains one to zero or more links from records in Link Field entity 324, and one to zero or more links to such records.

Link Table dependent entity 302 has primary keys TABLE_PRIME_NAME (FK) and TO.TABLE_PRIME_NAME (FK); and non-key attribute LINK_PRIME_NAME (fk); identifying relationship links 330 and 332 with Table Definition entity 304, and identifying relationship link 363 with Link Field entity 324; and contains (has) one to one or more records in Link Field entity 324.

Link Field dependent entity 324 has primary keys LINK_PRIME_NAME (FK), FIELD_PRIME_NAME (FK) and TOFIELD.FIELD_PRIME_NAME (FK); it has identifying relationship links 363 with Link Table entity 302, and identifying relationship links 341 and 343 with Field Definition entity 306; such that each record in Field Definition entity 306 links from one to one or more records in Link Field entity 324, and links to one to one or more such records.

In operation, for setting up a new model, first the table prime names are identified within the Table Definition entity 304. Next, the field prime names are identified within Field Definition entity 306 for each table. Next, every relationship between the tables in Table Definition entity 304 are defined in Link Table entity 302. These are entered in the TABLE_PRIME_NAME (FK) and TO.TABLE_PRIME_NAME (FK) fields. Finally, for each link established the related fields are identified for each table and to table: these fields are FIELD_PRIME_NAME (FK) and TOFIELD.FIELD_PRIME_NAME (FK) for each table/to table combination entered in Link Field entity 324. At this point, the meta data file 216 is established for a particular application, insofar as is required to establish relationships as prime objects. Meta data file 216 describes the user data in user data base file 218.

Referring to FIGS. 11, 13 and 15, the database model for the preferred embodiment of the invention will be described. This describes the entities, fields, links and relationships of the preferred embodiment of the invention for use (as described in connection with FIGS. 8–9) in developing and using a database model (as described, for example, in connection with FIG. 7). Thus, the physical representation (FIGS. 12, 14 and 16) of this model (FIGS. 11, 13 and 15) resides in file 216 (FIG. 8), and is accessed by a user at terminal 219.

Referring to FIG. 15, Application System independent entity 316 has primary key APPLSYS_PRIME_NAME, identifying relationship link 348 to Table Definition entity 304, identifying relationship link 336 to Link-Id entity 322, and identifying relationship link 338 to Attribute entity 326. As indicated by identifying relationship links 348, 336 and 338, respectively, Application System entity 316 has one to one or more Table Definition entity 304 records (that is, instances of records, or rows) in Table Definition entity 304, contains one to zero or more Link-Id entity 322 records, and has one to one or more Attribute entity 326 records.

Table Definition dependent entity 304 has primary keys APPLSYS_PRIME_NAME (FK) and TABLE_PRIME_NAME; non-key attributes TABLE_HQUAL_NAME, TABLE_SHORT_NAME, TABLE_SHORT_DESC, TABLE_ID and TABLE_VERSION_NUM; and identifying relationship links 330 and 332 with Link_Table entity 302, 334 with Field Definition entity 306, and 348 with Application System 316. Table Definition entity 304 links from one to zero or more records in Link-Table entity 302, and links to one to zero or more such records; and contains one to one or more records in Field Definition entity 306.

Field Definition dependent entity 306 has primary keys APPLSYS_PRIME_NAME (FK), TABLE_PRIME_NAME (FK) and FIELD_PRIME_NAME (FK); non-key attributes FIELD_SHORT_NAME, FIELD_SHORT_DESC, FIELD_HEADER_DESC, FIELD_DEFAULT_CD (FK), FIELD_DOMAIN_NAME (FK), CONTROL_NAME (FK), FIELD_CONTROL_TEXT, FIELD_REQUIRED_FG, FIELD_KEY_FG, FIELD_LENGTH_MS, FIELD_SEQ_NUM, FIELD_ORDBY_NUM, and FIELD_LOOKUP_NAME; identifying relationship link 334 with Table Definition entity 304, and 340 with Attribute entity 326; and non-identifying relationship links 364 with Field Domain entity 328, 352 with Control name entity 310, and 356 wit Default Domain 314. Each record in Control name entity 310 uses one to zero or more records in Field Definition entity 306; each record in Default Domain entity 314 defaults to one to zero or more records in Field Definition entity 306; each record in Table Defintion entity 304 contains one to one or more Field Definition entity 306 records; each record in Attribute entity 326 describes one to one or more records in Field Definition entity 306; and each record in Field Domain entity 328 has one to zero or more records in Field Definition entity 306.

Link-Table dependent entity 302 has primary keys APPLSYS_PRIME_NAME (FK), TABLE_PRIME_NAME (FK), LINK_ORDBY_NUM, and TO.TABLE_PRIME_NAME (FK); non-key attributes LINK_PRIME_NAME (FK), LINK_SHORT_DESC, WINDOW_TYPE_NAME (FK), LINK_TYPE_NAME (FK) CONTROL_NAME (FK), LINK_CONTROL_TXT, LINK_TYPE_FG, and LINK_ID; identifying relationship links 330 and 332 with Table Defintion entity 304; and non-identifying relationship links 350, 358, 360 AND 362 with Control name entity 310, Link type entity 318, Window type entity 320 and Link-Id entity 322, respectively. A record in Control name entity 310 uses one to zero or more Link-Table entity 302 records; each record in Table Definition entity 304 links from and links to one to zero or more records in Link-Table entity 302; each record in Link type entity 358 has one to zero or more records in Link_Table 302; each record in Window type entity 320 looks like one to zero or more records in Link-Table entity 302; and each record in Link-Id entity 322 is an alternate key to one to exactly one record in Link-Table entity 302.

Link type independent entity 318 has primary key LINK-TYPE-NAME, and non-key attributes LINK_TYPE_ID and LINK_TYPE_DESC. It has a non-identifying relationship link 358 with Link-Table entity 302, such that each record in Link type entity 318 has one to zero or more records in Link-Table 302.

Link_Id dependent entity 322 has primary keys APPLSYS_PRIME_NAME (FK) and LINK_PRIME_NAME. It has non-identifying relationship link 362 with Link-Table entity 302, identifying relationship link 336 with Application System entity 316, and identifying relationship link 342 with Link-Field entity 324; such that each record in Link-Id entity 322 is an alternate key to one to exactly one record in Link-Table entity 302, and has one to one or more records in Link-Field entity 324; and each record in Application System entity 316 contains one to one or more records in Link-Id entity 322.

Attribute dependent entity 326 has primary keys APPLSYS_PRIME_NAME (FK) and FIELD_PRIME_NAME. It has identifying relationship links 316, 340, 344 and 346 with Application System entity 316, Field Definition entity 306 and Link-Field entity 324, such that each record in Application System entity 316 has one to one or more records in Attribute entity 326; and each record in Attribute entity 326 links to and links from one to one or more records in Link-Field entity 324 and describes one to one or more records in Field Definition entity 306.

Window type independent entity 320 has primary key WINDOW_TYPE_NAME, and non-key attributes WINDOW_TYPE_ID and WINDOW_TYPE_DESC. It has a non-identifying relationship link to Link-Table entity 302, such that each record in Window type entity 320 looks like one to zero or more records in Link-Table entity 302.

Link-Field dependent entity 324 has primary keys APPLSYS_PRIME_NAME (FK), LINK_PRIME_NAME (FK), FILED_PRIME_NAME (FK) and TOFIELD.FIELD_PRIME_NAME (FK), and non-key attribute LINK_FILED_ID. It has identifying relationship links 342, 344 and 346 with Link-Id entity 322 and Attribute entity 326, such that each record in Link-Id entity has one to one or more Link_Field entity 324 records, and each record in Attribute entity 326 links to and links from one to one or more records in Link-Field entity 324.

Field Domain dependent entity 328 has primary key FIELD_DOMAIN_NAME, and non-key attributes FIELD_DOMAIN_ID and FIELD_DOMAIN_DESC. It has non-identifying relationship link 364 with Field Domain entity 306, such that each record in Field Domain entity 328 has one to zero or more records in Field Definition entity 306.

Control name independent entity 310 has primary key CONTROL_NAME, and non-key attributes CONTROL_ID and CONTROL_DESC. It has non-identifying relationship links 350 and 352 with Link-Table entity 302 and Field Definition entity 306, such that each record in Control name entity 310 uses one to zero or more records in Link-Table entity 302 and one to zero or more records in Field Definition entity 306.

Default Value independent entity 312 has primary key DEFAULT_NAME and non-key attributes DEFAULT_ID and DEFAULT_DESC. It has non-identifying relationship link 354 with Default Domain entity 314, such that each record in Default Value entity is identified by one to exactly one record in Default Domain entity 314.

Default Domain independent entity 314 has primary key FIELD_DEFAULT_CD and non-key attribute DEFAULT_NAME (FK), with non-identifying links 354 to Default Value entity 312 and 356 to Field Definition entity; such that each record in Default Value entity 312 is identified by one to exactly one record in Default Domain entity 314, and each record in Default Domain entity 314 defaults to one to zero or more records in Field Definition entity 306.

The EAR model of the preferred embodiment of the invention assures data integrity, and maintains the referential integrity and cardinality of the user interface, assures that the data model is updated when changes are made to the user interface, and automatically develops the concept of traversing screen to screen. That is, within a data model, invoking a relationship can be visualized as moving from one screen entity to another, thereby transversing the data model.

Referring to the physical model of FIGS. 12, 14 and 16, in connection with the EAR model of FIGS. 11, 13 and 15, Application_System 416 is a physical model representation of Application System 316, with relationship links 448, 436 and 438 corresponding to links 348, 336 and 338, respectively, and primary key APPLSYS_PRIME_NAME. (APPLSYS_PRIME_NAME: CHAR(8) in entity 404 is not a foreign key that should be listed in Table 1 because Application Systam 416 was not implemented in this embodiment of the physical model, but does appear as a foreign key in the EAR model for completeness.)

TABLE_DEFINITIONS entity 404 is a physical model representation of Table Definition entity 304, with relationships links 430, 432, 434 and 448 corresponding to links 330, 332, 334 and 348, respectively, and with columns, indexes, primary keys and foreign keys, including type, length, attributes and order as further set forth in Table 1.

FIELD_DEFINTIONS entity 406 is a physical model representation of Field Definition entity 306, with relationship links 434, 440 and 464 corresponding to links 334, 340 and 364, respectively, and is further described in Table 2.

LINK_TABLE_DEFS entity 402 is a physical model representation of Link-Table entity 302, with relationship links 430, 432, 458, 460 and 462 corresponding to links 330, 332, 358, 360 and 362, respectively, and is further described in Table 3.

LINK_FIELD_DEFS entity 424 is a physical model representation of Link-Field entity 324, with relationship links 442, 444 and 446 corresponding to links 342, 344 and 346, respectively, and is further described in Table 4.

TYPEDEF_LINKS entity 418 is a physical model representation of Link type entity 318, with relationship link 458 corresponding to link 358, and is further described in Tables 5 and 6.

TYPEDEF_CONTROLS entity 410 is a physical model representation of Control name entity 310, with relationship links 450 and 452 corresponding to links 350 and 352, respectively, and is further described in Tables 7 and 8.

TYPEDEF_FIELDS entity 428 is a physical model representation of Field Domain entity 328, with relationship link 464 corresponding to link 364, and is further described in Tables 9 and 10.

TYPEDEF_DEFAULTS entity 412 is a physical model representation of Default Value entity 312, with relationship link 454 corresponding to link 354, and is further described in Tables 11 and 12.

TYPEDEF_WINDOWS entity 420 is a physical model representation of Window type entity 320, with relationship link 460 corresponding to link 360, and is further described in Tables 13 and 14.

Link_Id entity 422 is a physical model representation of Link-ID entity 322, with relationship links 462 and 436 corresponding to links 362 and 336, respectively, and has primary keys APPLYSYS_PRIME_NAME and LINK_PRIME_NAME.

Field entity 426 is a physical model representation of Attribute entity 326, with relationship links 438, 440, 444 and 446 corresponding to 338, 340, 344 and 346, respectively, and has primary keys APPLSYS_PRIME_NAME and FIELD_PRIME_NAME.

Default_Domain entity 414 is a physical model representation of Default Domain 314, with relationship links 454 and 456 corresponding to links 354 and 356, respectively, and has primary key FIELD_DEFAULT_CD and foreign key DEFAULT_NAME.

Referring now to FIG. 11, the operation of the database structure of the invention will be described. Application System entity 316 contains the name of the model or database 218 and is chosen by the user upon beginning to build or create a database model. Next, accessing Table Definition entity 304, the user defines every entity (that is, table—such as is illustrated in connection with the database example of FIG. 7) within that data model. Application System entity 316 must be defined in order to set up Table Definition entity 304. As previously noted, entities are defined by primary keys above the line and by additional attributes below line. Every entity (for example, FIG. 7 tables 370, 372, 374, 376, 378, 380, 382, 384, 386, 388 and 390) defined by Table Definition entity 304 contains fields which are defined by accessing Field Definition entity 306. As is specified by relationship link 334, to define a field, the user must have previously defined an entity (or, table). The primary keys to each field or record defined within Field Definition entity 306 are name of application APPLSYS_PRIME_NAME (FK), name of table TABLE_PRIMEK_NAME (FK), and name of field FIELD_PRIME_NAME (FK). Other attributes below line describe, but don't uniquely identify, a record in Field Definition entity 306.

Every entity defined by Table Definition entity 304 needs to have relationships defined to other entities: so two relationship links 330 and 332 are required with respect to Link-Table entity 302 to define a relationship. The primary keys for defining a relationship include application name APPLSYS_PRIME_NAME (FK), table from TABLE_PRIME_NAME (FK), table to TO.TABLE_PRIME_NAME (FK), and a unique link number LINK_ORDBY_NUM (because it is possible to have more than one link between two entities.) Other attributes of a relationship are below the line in Link-Table entity 302. Link type entity 318 identifies relationship type and the processing that must occur in response to activation of change key 226 (FIG. 10) in order to assure referential integrity and cardinality at the user interface. Examples of link types are description, cascaded delete, restricted delete—as set forth in Tables 5 and 6.

By way of further explanation of the the preferred embodiment of the invention, Link-Field entity 324 records are relationship descriptions, describing how to link two entities (tables) together, and include data describing the to field and from field. Relationship link 362 represents an alternate key to Link-Id entity 322 based on prime name LINK_PRIME_NAME and provides a verb describing the relationship. There is Link-Id entity 322 record (relationship link 362) to every Link-Table entity 302 record. This simplifies the complexity otherwise required in Link-Field entity 324, but is otherwise essential. Link-Field entity 324 also provides a field prime name FIELD_PRIME_NAME (FK) that is unique to the system and that does not depend on an entity, for the table name appears in the link. Field prime name FIELD_PRIME_NAME exists in Attribute entity 326 as another description of records in Field Definition entity 306. With Link Id entity 322 and Attribute 326 a link is defined for an application system (from field and to field), that uniquely defines a field within a link. Another attribute, below the line in Link Field 324, is LINK_FILED_ID—used to sort all of the links in the database.

Referring to FIG. 12, description of the operation of an embodiment of a physical model implementation of the database model of FIG. 11 of the invention will be described. Entity names in upper case are tables. In lower case, they are implementation specific.

Type definition defaults TYPEDEF_DEFAULTS entity 412 may have many default names, which is name of code that runs in response to user initiating a session at terminal 219. Each default name has a spot in FIELD_DEFINITIONS entity 406 to put default codes and has a map at default domain 414 that specifies that a default can be defined by a default name at 412. If a field 406 does map through default domain 414 to a default name 404, then there is a description of how that function works.

Field Domain 328 provides a listing of valid values as specified in Table 10. On the other hand, Default_Domain entity 414 defines the information displayed to the user and the processing which must occur when a field (that is, attribute within an entity or table) is initially substantiated.

TYPEDEF_CONTROLS entity 410 provides information needed by link table definition LINK_TABLE_DEFS entity 402 and FIELD_DEFINITIONS entity 406 and define the type of controls used to invoke link relationship LINK_TABLE_DEFS entity 402. FIELD_DEFINITIONS entity 406 may define fields which are, for example, text, audio, or bit map (see Table 2). TYPEDEF_WINDOWS entity 420, if type is description (see decision block 240 in FIG. 10), invokes text type window (Table 14) for display to the user. A list box type gives a list of items from which the user may select at select block 246 (FIG. 10).

Advantages Over the Prior Art

The invention provides an interface design tool that directly accesses the entity, attribute, relationship (EAR) data model and generates an appropriate user interface.

The structure and method of the preferred embodiment of this invention enable a user to avoid having to learn many complicated syntaxes, by allowing the user to design a database system at a user friendly interface, such as a graphical user interface or dumb terminal. Such a user need not understand, nor be required to access, the underlying data model.

Further, the invention provides assurance that as the user interface is developed, the underlying data model is updated—and fixing one will automatically fix the other.

Further still, the invention provides an interface design tool that takes the entities, attributes, and relationships, with cardinality and optionality on data models, and generates therefrom a working user interface characterized by useability and assured data integrity.

TABLE 1

TABLE=DESTINY.TABLE_DEFINITIONS

****COLUMNS****

| Column Name | Type | Length | Attributes |
|---|---|---|---|
| APPLSYS_PRIME_NAME | Char (Fixed) | 8 | Data req, Text |
| TABLE_PRIME_NAME | Char (Fixed) | 8 | Data req, Text |
| TABLE_HQUAL_NAME | Char (Fixed) | 8 | Data req, Text |
| TABLE_SHORT_NAME | Char (Fixed) | 32 | Data req, Text |
| TABLE_SHORT_DESC | Char (Var) | 72 | Data req, Text |
| TABLE_ID | Small Integer | | Data required |
| TABLE_VERSION_NUM | Decimal | 5.2 | Data required |

****INDEXES****

| | |
|---|---|
| Index name: | DESTINY.TABLEDEFS_XU |
| Duplicates Allowed: | No |
| Column Name | Order |
| TABLE_ID | Descending |

****PRIMARY KEY****

| | |
|---|---|
| Index Name: | SYSIBM.SQL941201163754530 |
| Column Name | Order |
| TABLE_PRIME_NAME | Ascending |
| APPLSYS_PRIME_NAME | Ascending |

****FOREIGN KEYS****

TABLE 2

TABLE=DESTINY.FIELD_DEFINITIONS

****COLUMNS****

| Column Name | Type | Length | Attributes |
|---|---|---|---|
| APPLSYS_PRIME_NAME | Char (Fixed) | 8 | Data req, Text |
| TABLE_PRIME_NAME | Char (Fixed) | 8 | Data req, Text |
| FIELD_PRIME_NAME | Char (Fixed) | 8 | Data req, Text |
| FIELD_SHORT_NAME | Char (Var) | 72 | Data req, Text |
| FIELD_SHORT_DESC | Char (Var) | 72 | Data req, Text |
| FIELD_HEADER_DESC | Char (Var) | 72 | Data req, Text |
| FIELD_DEFAULT_CD | Char (Var) | 72 | Text |
| FIELD_DOMAIN_NAME | Char (Fixed) | 8 | Data req, Text |
| CONTROL_NAME | Char (Fixed) | 8 | Data req, Text |
| FIELD_CONTROL_TXT | Char (Fixed) | 32 | Data req, Text |
| FIELD_REQUIRED_FG | Char (Fixed) | 1 | Data req, Text |
| FIELD_KEY_FG | Char (Fixed) | 1 | Data req, Text |
| FIELD_LENGTH_MS | Small Integer | | Data required |
| FIELD_SEQ_NUM | Small Integer | | Data required |
| FIELD_ORDBY_NUM | Small Integer | | Data required |
| FIELD_LOOKUP_NAME | Char (Fixed) | 8 | Data req, Text |

****INDEXES****
****PRIMARY KEY****

| | |
|---|---|
| Index Name: | SYSIBM.5QL950103161912810 |
| Column Name | Order |

TABLE 2-continued

TABLE=DESTINY.FIELD_DEFINITIONS

| | |
|---|---|
| FIELD_PRIME_NAME | Ascending |
| TABLE_PRIME_NAME | Ascending |
| APPLSYS_PRIME_NAME | Ascending |

****FOREIGN KEYS****

| | |
|---|---|
| Foreign Key Name: | DOMAINID |
| Parent table name: | DESTINY.TYPEDEF_FIELDS |
| Delete Rule: | Restrict deletes |
| Columns | |

| | |
|---|---|
| FIELD_DOMAIN_NAME | |
| Foreign Key Name: | FLDCNTRL |
| Parent table name: | DESTINY.TYPEDEF_CONTROLS |

TABLE 3

TABLE=DESTINY.LINK_TABLE_DEFS

****COLUMNS****

| Column Name | Type | Length | Attributes |
|---|---|---|---|
| APPLSYS_PRIME_NAME | Char (Fixed) | 8 | Data req, Text |
| LINK_PRIME_NAME | Char (Fixed) | 8 | Data req, Text |
| TABLE_PRIME_NAME | Char (Fixed) | 8 | Data req, Text |
| T_TABLE_PRIME_NAME | Char (Fixed) | 8 | Data req, Text |
| LINK_ORDBY_NUM | Small Integer | | Data required |
| LINK_SHORT_DESC | Char (Var) | 72 | Data req, Text |
| WINDOW_TYPE_NAME | Char (Fixed) | 8 | Data req, Text |
| LINK_TYPE_NAME | Char (Fixed) | 8 | Data req, Text |
| CONTROL_NAME | Char (Fixed) | 8 | Data req, Text |
| LINK_CONTROL_TXT | Char (Fixed) | 18 | Data req, Text |
| LINK_TYPE_FG | Char (Fixed) | 1 | Data req, Text |
| LINK_ID | Small Integer | | Data required |

****INDEXES****

| | |
|---|---|
| Index name: | DESTINY.LINK_TABLE_XU |
| Duplicates Allowed: | No |
| Column Name | Order |

| | |
|---|---|
| LINK_ID | Descending |
| APPLSYS_PRIME_NAME | Ascending |

| | |
|---|---|
| Index name: | DESTINY.LINK_TABLE_XU2 |
| Duplicates Allowed: | No |
| Column Name | Order |

| | |
|---|---|
| TABLE_PRIME_NAME | Ascending |
| T_TABLE_PRIME_NAME | Ascending |
| LINK_ORDBY_NUM | Descending |
| APPLSYS_PRIME_NAME | Ascending |

****PRIMARY KEY****

| | |
|---|---|
| Index Name: | SYSIBM.5QL941201163834750 |
| Column Name | Order |

| | |
|---|---|
| LINK_PRIME_NAME | Ascending |
| APPLSYS_PRIME_NAME | Ascending |

TABLE 4

TABLE=DESTINY.LINK_FIELD_DEFS

****COLUMNS****

| Column Name | Type | Length | Attributes |
|---|---|---|---|
| APPLSYS_PRIME_NAME | Char (Fixed) | 8 | Data req, Text |
| LINK_PRIME_NAME | Char (Fixed) | 8 | Data req, Text |

TABLE 4-continued

TABLE=DESTINY.LINK_FIELD_DEFS

| Column Name | Type | Length | Attributes |
|---|---|---|---|
| FIELD_PRIME_NAME | Char (Fixed) | 8 | Data req, Text |
| T_FIELD PRIME_NAME | Char (Fixed) | 8 | Data req, Text |
| LINK_FIELD_ID | Small Integer | | Data required |

****INDEXES****

| | |
|---|---|
| Index name: | DESTINY.LINK_FIELD_DEFS_XU |
| Duplicates Allowed: | No |
| Column Name | Order |

| | |
|---|---|
| LINK_PRIME_NAME | Ascending |
| LINK_FIELD_ID | Descending |
| APPLSYS_PRIME_NAME | Ascending |

| | |
|---|---|
| Index name: | DESTINY.LINK_TFIELD_I |
| Duplicates Allowed: | Yes |
| Column Name | Order |

| | |
|---|---|
| T_FIELD_PRIME_NAME | Ascending |

| | |
|---|---|
| Index name: | DESTINY.LINK_TFIELD_I |
| Duplicates Allowed: | Yes |
| Column Name | Order |

| | |
|---|---|
| FIELD_PRIME_NAME | Ascending |

****PRIMARY KEY****

| | |
|---|---|
| Index Name: | SYSIBM.5QL941205131559000 |
| Column Name | Order |

| | |
|---|---|
| LINK_PRIME_NAME | Ascending |
| FIELD_PRIME_NAME | Ascending |
| T_FIELD_PRIME_NAME | Ascending |
| APPLSYS_PRIME_NAME | Ascending |

TABLE 5

TABLE=DESTINY.TYPEDEF_LINKS

****COLUMNS****

| Column Name | Type | Length | Attributes |
|---|---|---|---|
| LINK_TYPE_NAME | Char (Fixed) | 8 | Data req, Text |
| LINK_TYPE_ID | Small Integer | | Data required |
| LINK_TYPE_DESC | Char (Var) | 72 | Data req, Text |

****INDEXES****

| | |
|---|---|
| Index name: | DESTINY.TYPEDEF_LINK_XU |
| Duplicates Allowed: | No |
| Column Name | Order |

| | |
|---|---|
| LINK_TYPE_ID | Descending |

****PRIMARY KEY****

| | |
|---|---|
| Index Name: | SYSIBM.SQL941130081854400 |
| Column Name | Order |

| | |
|---|---|
| LINK_TYPE_NAME | Ascending |

TABLE 6

LINK TYPES

| LINK TYPE NAME | LINK TYPE ID | LINK TYPE DESCRIPTION |
|---|---|---|
| STD | 0 | Standard link between tables |
| REFINT | 1 | Referential integrity enforced in link |

TABLE 6-continued

LINK TYPES

| LINK TYPE NAME | LINK TYPE ID | LINK TYPE DESCRIPTION |
|---|---|---|
| CASDEL | 2 | Cascaded delete implemented |
| NULLINS | 3 | Nulls inserted on delete |

TABLE 7

TABLE=DESTINY.TYPEDEF_CONTROLS

****COLUMNS****

| Column Name | Type | Length | Attributes |
|---|---|---|---|
| CONTROL_NAME | Char (Fixed) | 8 | Data req, Text |
| CONTROL_ID | Small Int | | Data required |
| CONTROL_DESC | Char (Var) | 72 | Data req, Text |

****INDEXES****

| | |
|---|---|
| Index name: | DESTINY.TYPEDEF_CONTROL_XU |
| Duplicates Allowed: | No |
| Column Name | Order |
| CONTROL_ID | Descending |

****PRIMARY KEY****

| | |
|---|---|
| Index Name: | SYSIBM.5QL941130082059780 |
| Column Name | Order |
| CONTROL_NAME | Ascending |

TABLE 8

CONTROL NAME DESCRIPTION

| CONTROL NAME | CONTROL ID | CONTROL DESCRIPTION |
|---|---|---|
| ENTRY | 0 | Entry field |
| MLE | 1 | Multiple line entry field |
| RADIO | 2 | Radio buttons |
| CHECK | 3 | Check boxes |
| SPIN | 4 | Spin entry fields |
| SLIDER | 5 | Slider tab fields |
| PUSH | 6 | Pushbotton control |

TABLE 9

TABLE=DESTINY.TYPEDEF_FIELDS

****COLUMNS****

| Column Name | Type | Length | Attributes |
|---|---|---|---|
| FIELD_TYPE_NAME | Char (Fixed) | 8 | Data req, Text |
| FIELD_TYPE_ID | Small integer | | Data required |
| FIELD_TYPE_DESC | Char (Var) | 72 | Data req, Text |

****INDEXES****

| | |
|---|---|
| Index name: | DESTINY.TYPEDEF_FIELD_XU |
| Duplicates Allowed: | No |
| Column Name | Order |
| FIELD_TYPE_ID | Descending |

TABLE 9-continued

TABLE=DESTINY.TYPEDEF_FIELDS

****PRIMARY KEY****

| | |
|---|---|
| Index Name: | SYSIBM.SQL941130082002400 |
| Column Name | Order |
| FIELD_TYPE_NAME | Ascending |

TABLE 10

FIELD TYPE NAMES

| FIELD TYPE NAME | FIELD TYPE ID | FIELD TYPE DESCRIPTION |
|---|---|---|
| TEXT | 0 | No conversion, only printable data |
| DECIMAL | 4 | Pos, neg, and floating point |
| DATEU | 5 | MM-DD-YYYY in USA format |
| ALPHANUM | 1 | A–Z, 0–9 converted to upper case |
| ALPHA | 2 | A–Z converted to upper case |
| INTEGER | 3 | 0–9 digits only |
| PHONE | 6 | (AAA)TTT-NNNN area code & phone # |
| YESNO | 7 | Upper case translation for Y or N |
| EDITBOX | 8 | Multiple-line text editor control |
| TIELINE | 9 | Phone number in XXX-NNNN format |
| SEQ# | 10 | Number associated with a line number of a description |
| DESCRIPT | 11 | Fixed line of a description. See ATTR_TYPE=10 |

TABLE 11

TABLE=DESTINY.TYPEDEF_DEFAULTS

****COLUMNS****

| Column Name | Type | Length | Attributes |
|---|---|---|---|
| DEFAULT_NAME | Char (Fixed) | 16 | Data req, text |
| DEFAULT_ID | Small Int | | Data required |
| DEFAULT_DESC | Char (Var) | 72 | Data req, text |

****PRIMARY KEY****

| | |
|---|---|
| Index Name: | SYSIBM.SQL941215110846410 |
| Column Name | Order |
| DEFAULT_NAME | Ascending |

TABLE 12

DEFAULT NAME

| DEFAULT NAME | DEFAULT ID | DEFAULT DESCRIPTION |
|---|---|---|
| ^USERID | 0 | Current active network logon ID |
| ^KEY | 1 | New SYSKEY (1 + current max key) |
| ^USADATE | 2 | Today's date in MM-DD-YYYY format |
| ^ISODATE | 3 | Today's date in YYYY-MM-DD format |
| ^EURDATE | 4 | Today's date in DD-MM-YYYY format |
| ^TIMESTAMP | 5 | Current time in YYYY-MM-DD HH:MM:SS format |
| ^CLOCK | 6 | Current time in HH:MM format |

TABLE 13

TABLE=DESTINY.TYPEDEF_WINDOWS

****COLUMNS****

| Column Name | Type | Length | Attributes |
|---|---|---|---|
| WINDOW_TYPE_NAME | Char (Fixed) | 8 | Data req, Text |
| WINDOW_TYPE_ID | Small Int | | Data required |
| WINDOW_TYPE_DESC | Char (Var) | 72 | Data req, Text |

****INDEXES****

| | |
|---|---|
| Index name: | DESTINY.TYPEDEF_WINDOW_XU |
| Duplicates Allowed: | No |
| Column Name | Order |
| WINDOW_TYPE_ID | Descending |

****PRIMARY KEY****

| | |
|---|---|
| Index Name: | SYSIBM.SQL941130081758780 |
| Column Name | Order |
| WINDOW_TYPE_NAME | Ascending |

TABLE 14

WINDOW TYPE NAMES

| WINDOW TYPE NAME | WINDOW TYPE ID | WINDOW TYPE DESCRIPTION |
|---|---|---|
| TEXT | 0 | Normal long descriptions with sequence numbers |
| LISTBOX | 1 | Many rows selected, displayed as a list of rows |
| MCLB | 2 | Many rows selected, displayed as a multi-column list box |

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for generating a dynamic user interface from a data model of a database, comprising the steps of:

defining the database entities, attributes, and relationships describing a data model describing a relational data base of an application, said relationships representing connections, links, and associations between entities in the data model;

directly accessing said data model described by said entities, attributes, and relationships; and generating the dynamic user interface directly from the data model, said dynamic user interface adapted to directly access said relational data base.

2. The method of claim 1, wherein the data model comprises an EAR (entities, attributes, and relationships) data model.

3. The method of claim 1, wherein said dynamic user interface is adapted to directly update said relational data base, and wherein said data model is adapted to directly update said dynamic user interface.

4. The method of claim 1, further comprising the step, after the step of generating the dynamic user interface, of directly updating the relational data base using the dynamic user interface.

5. The method of claim 4, wherein said step of directly updating the relational data base using the dynamic user interface comprises at least one of inserting data, deleting data, and modifying data.

6. A method for operating a digital computer to dynamically transverse an application database by using a data model of the database, comprising the steps of:

dynamically operating a user interface to select a first entity existing in the data model;

identifying relationships defined within the data model linking said first entity of the data model to one or more other entities within the data model;

establishing a control at said user interface for each linking relationship defined within the data model;

operating a selected graphic user interface control to initiate an action with respect to said entity existing in the data model;

defining for at least one of said linking relationships a description type;

defining within a description entity for each relationship having a description type information necessary to enforce cardinality rules;

responsive to identifying a linking relationship having a description type, accessing said description entity to enforce said cardinality rules; and dynamically enforcing the cardinality rules.

7. The method of claim 6, wherein the data model comprises an EAR (entities, attributes and relationships) data model.

8. A method for controlling a digital computer to model a database for generating a user interface, comprising the steps of:

defining the entities, attributes, and relationships describing a data model of an application, the relationships representing connections, links, and associations between entities in a data model;

directly accessing the data model described by the entities, attributes, and relationships, generating the user interface from the data model, and identifying and correcting any missing entities, attributes, or relationships describing the data model.

* * * * *